(12) United States Patent
Oshiro

(10) Patent No.: US 11,762,411 B2
(45) Date of Patent: Sep. 19, 2023

(54) THROTTLE OPERATING DEVICE

(71) Applicant: ASAHI DENSO CO., LTD., Hamamatsu (JP)

(72) Inventor: Yukio Oshiro, Hamamatsu (JP)

(73) Assignee: ASAHI DENSO CO., LTD., Shizuoka (JP)

( * ) Notice: Subject to any disclaimer, the term of this patent is extended or adjusted under 35 U.S.C. 154(b) by 0 days.

(21) Appl. No.: 17/540,732

(22) Filed: Dec. 2, 2021

(65) Prior Publication Data

US 2022/0179442 A1    Jun. 9, 2022

(30) Foreign Application Priority Data

Dec. 4, 2020 (JP) .................................. 2020-201990
Feb. 18, 2021 (JP) .................................. 2021-024561

(51) Int. Cl.
*G05G 1/04* (2006.01)
*G05G 5/03* (2008.04)
*B62K 23/06* (2006.01)

(52) U.S. Cl.
CPC .................. *G05G 1/04* (2013.01); *G05G 5/03* (2013.01); *B62K 23/06* (2013.01)

(58) Field of Classification Search
None
See application file for complete search history.

(56) References Cited

U.S. PATENT DOCUMENTS

| 7,798,122 | B2* | 9/2010 | Chandran | B62K 23/04 |
| | | | | 123/399 |
| 8,082,819 | B2* | 12/2011 | Case | B62K 23/06 |
| | | | | 74/489 |
| 8,327,735 | B2* | 12/2012 | Suzuki | G05G 1/04 |
| | | | | 74/489 |
| 10,843,764 | B2* | 11/2020 | Hengst | B62K 11/14 |
| 2010/0043589 | A1* | 2/2010 | Chandran | B62K 11/14 |
| | | | | 74/504 |

FOREIGN PATENT DOCUMENTS

JP         2010-053836 A       3/2010

* cited by examiner

*Primary Examiner* — Vicky A Johnson
(74) *Attorney, Agent, or Firm* — Pearne & Gordon, LLP

(57) ABSTRACT

A throttle operating device includes: a fixing member which is fixed to a vicinity of a grip formed at a tip of a handlebar of a vehicle; a throttle lever which is attached by extending from the fixing member and configured to be pivoted while the grip is gripped; a detection sensor configured to detect a rotational operation angle of the throttle lever; and a resistance force applying unit configured to generate friction during a rotational operation of the throttle lever to apply a resistance force. A drive source of a vehicle is controlled based on the rotational operation angle of the throttle lever detected by the detection sensor.

10 Claims, 21 Drawing Sheets

THROTTLE OPERATING DEVICE

CROSS-REFERENCE TO RELATED APPLICATIONS

The present application claims the benefit of priority of Japanese Patent Applications No. 2020-201990, filed on Dec. 4, 2020, and No. 2021-024561, filed on Feb. 18, 2021, the content of which is incorporated herein by reference.

TECHNICAL FIELD

The present invention relates to a throttle operating device capable of controlling a drive source of a vehicle based on a rotational operation angle of a throttle lever detected by a detection sensor.

BACKGROUND ART

As a throttle operating device of the related art for operating a throttle opening in a car such as an ATV or a four-wheel buggy, a ship such as a PWC (personal watercraft), or a vehicle such as a snow vehicle, for example, as disclosed in JP-A-2010-53836, a device provided with a throttle lever (thumb throttle lever) attached to a vicinity of a grip can be mentioned. Such a throttle operating device of the related art is configured so that when a finger of the driver's hand holding the grip is extended to the throttle lever and a rotational operation is performed, a detection sensor can detect a rotational operation angle and control an engine of the vehicle.

However, in the related art described above, when the throttle lever is rotated, an urging force by a return spring is applied, but a resistance force during operation is small, and there is a feeling of strangeness in the operation compared to the one which transmits the operation of the throttle lever to an engine side via an operation wire. As a result, there is room to improve operability.

SUMMARY

The invention is made in view of such circumstances and an object of the invention is to provide a throttle operating device capable of improving operability during a rotational operation of a throttle lever.

According to an aspect of the invention, there is provided a throttle operating device including: a fixing member which is fixed to a vicinity of a grip formed at a tip of a handlebar of a vehicle; a throttle lever which is attached by extending from the fixing member and configured to be pivoted while the grip is gripped; a detection sensor configured to detect a rotational operation angle of the throttle lever; and a resistance force applying unit configured to generate friction during a rotational operation of the throttle lever to apply a resistance force, where a drive source of a vehicle is controlled based on the rotational operation angle of the throttle lever detected by the detection sensor.

DESCRIPTION OF EMBODIMENTS

Hereinafter, embodiments of the invention will be specifically described with reference to the drawings.

Figure 1:
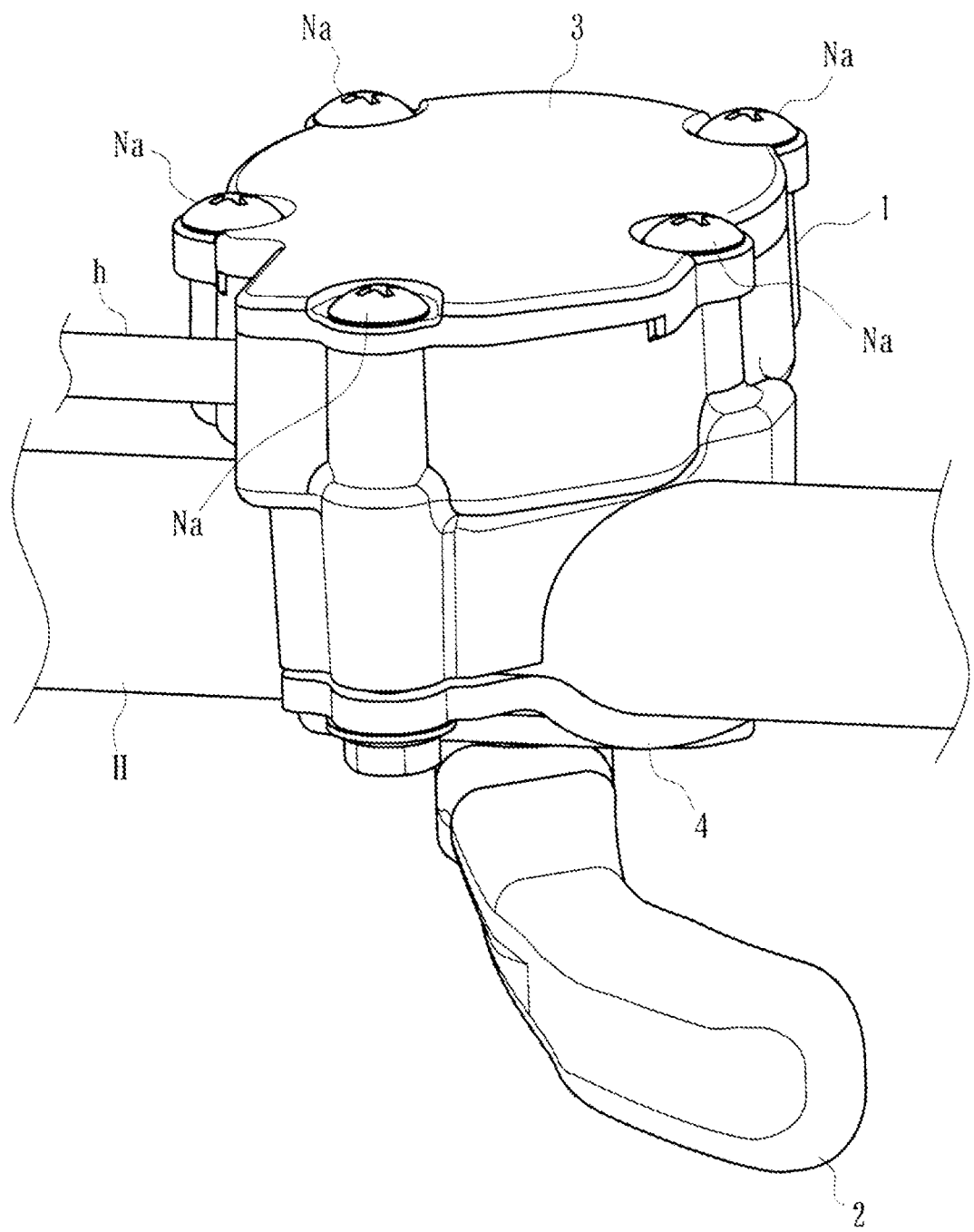
FIG. 1 is an overall perspective view illustrating a throttle operating device according to a first embodiment of the invention.
Figure 2:
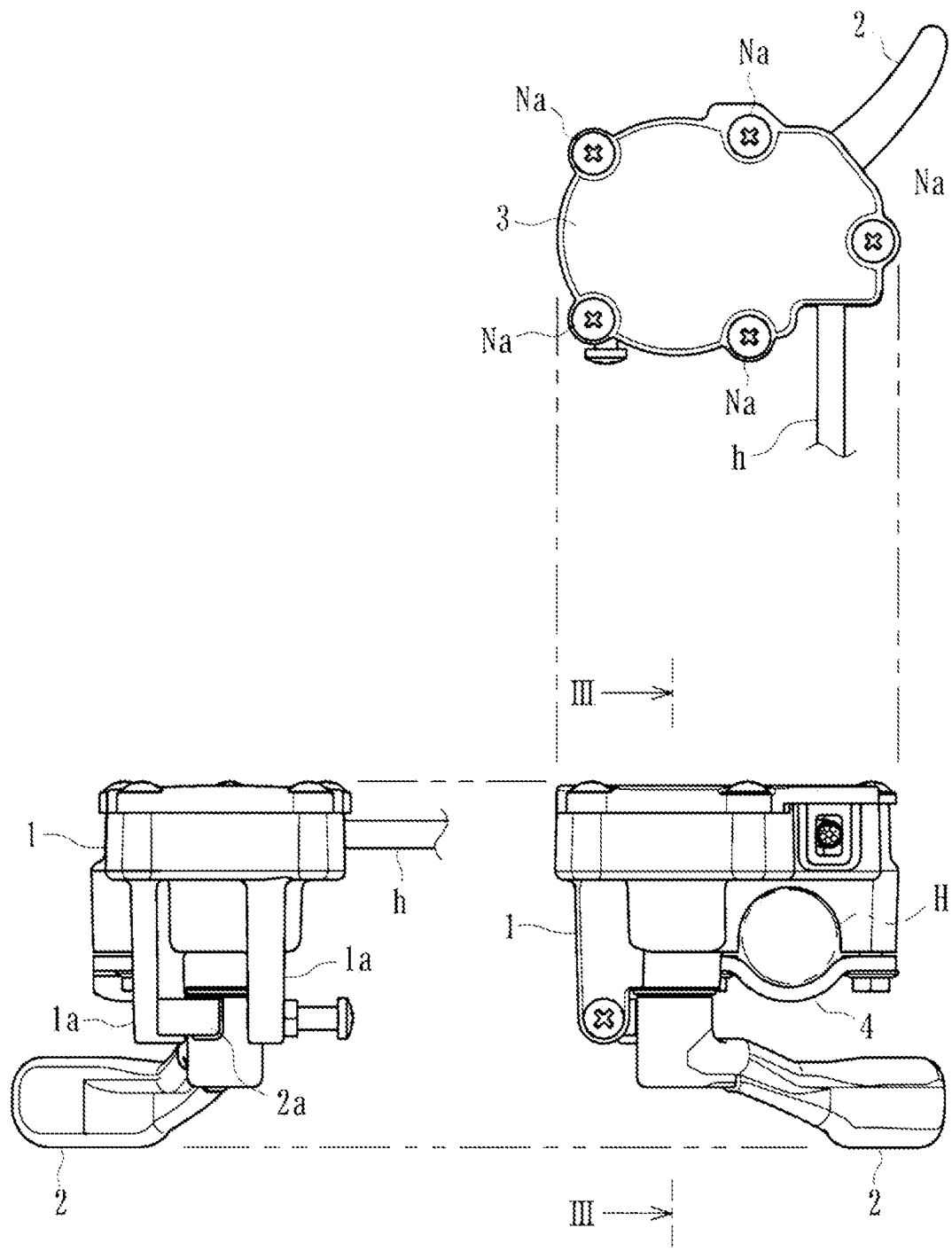
FIG. 2 is a three-view orthographic projection illustrating the throttle operating device.
Figure 3:
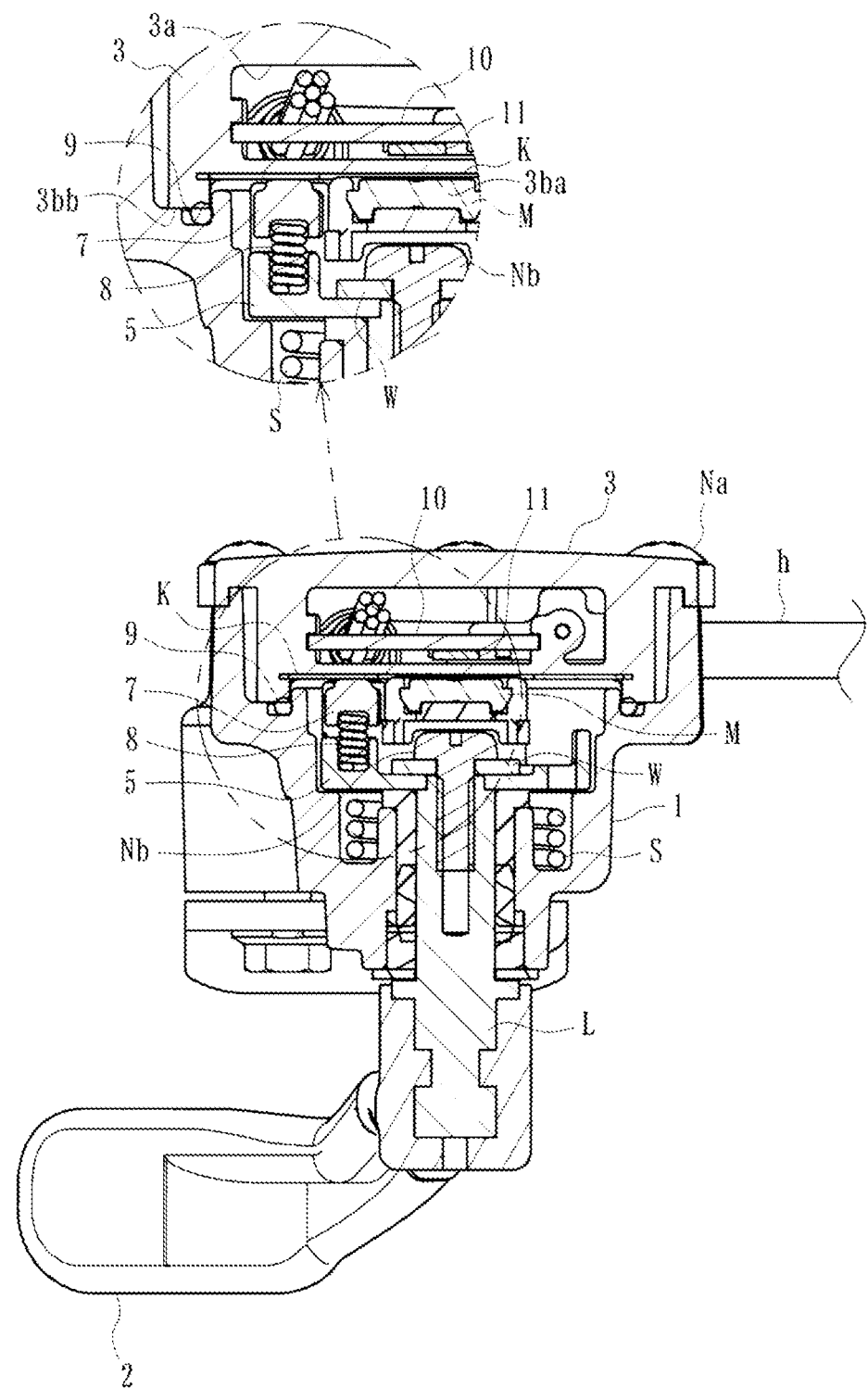
FIG. 3 is a cross-sectional view taken along the line of FIG. 2.

A throttle operating device according to a first embodiment is fixed to a handlebar of a car such as an ATV or a buggy, a ship such as a PWC (personal watercraft), or a vehicle (in the present embodiment, a car such as an ATV or a buggy) such as a snow vehicle so that an engine (drive source) of the car can be controlled. As illustrated in FIGS. 1 to 3, the throttle operating device is configured to include a fixing member 1, a throttle lever 2 which is a so-called thumb lever, a cover member 3, a rotating member 5, a resistance force applying unit 7, a detection sensor 11, a return spring S, and a sliding member K.

Figure 4:
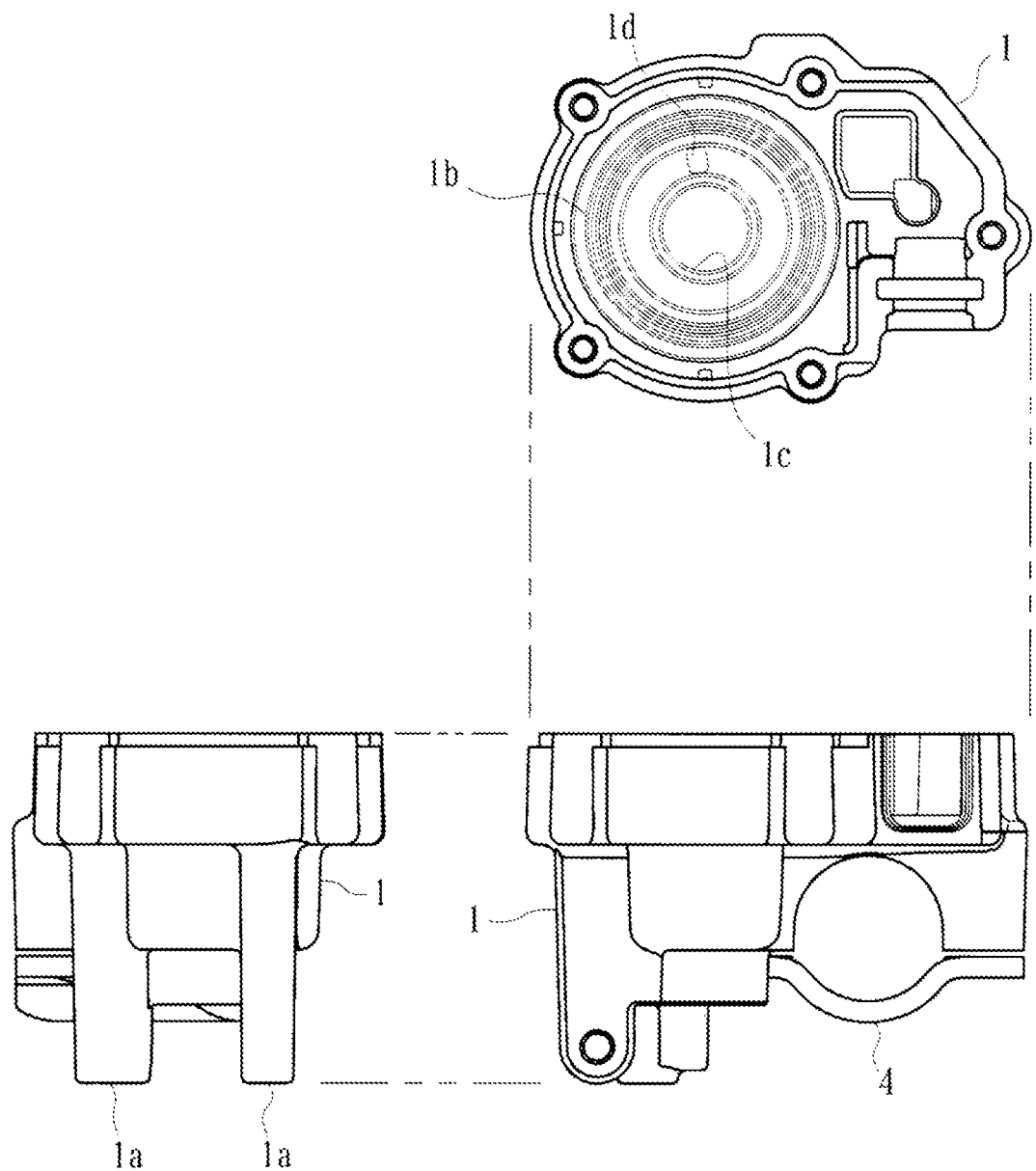
FIG. 4 is a three-view orthographic projection illustrating a fixing member of the throttle operating device.

The fixing member 1 is fixed to a handlebar H to pivotally support the throttle lever 2 and is fixed to a vicinity of a grip formed at a tip of the handlebar H of the vehicle. As illustrated in FIG. 4, the fixing member 1 has an opening at an upper side to form an accommodation recess portion inside and a pinching member 4 is attached to the fixing member 1. The fixing member 1 can be fixed by pinching the handlebar H with the pinching member 4.

Further, the fixing member 1 is formed with a pair of regulating portions 1a-1a formed at a predetermined position on the outside thereof so as to be separated from each other by a predetermined dimension. Further, on a bottom surface of the accommodation recess portion formed inside, a mounting groove 1b for fitting and positioning a sealing member 9 (see FIG. 3), a through hole 1c through which a shaft member L is inserted to allow a rotational operation of the throttle lever 2, and a locking portion 1d for locking the other end Sb (see FIGS. 6 and 8) of the return spring S are formed.

Figure 7:
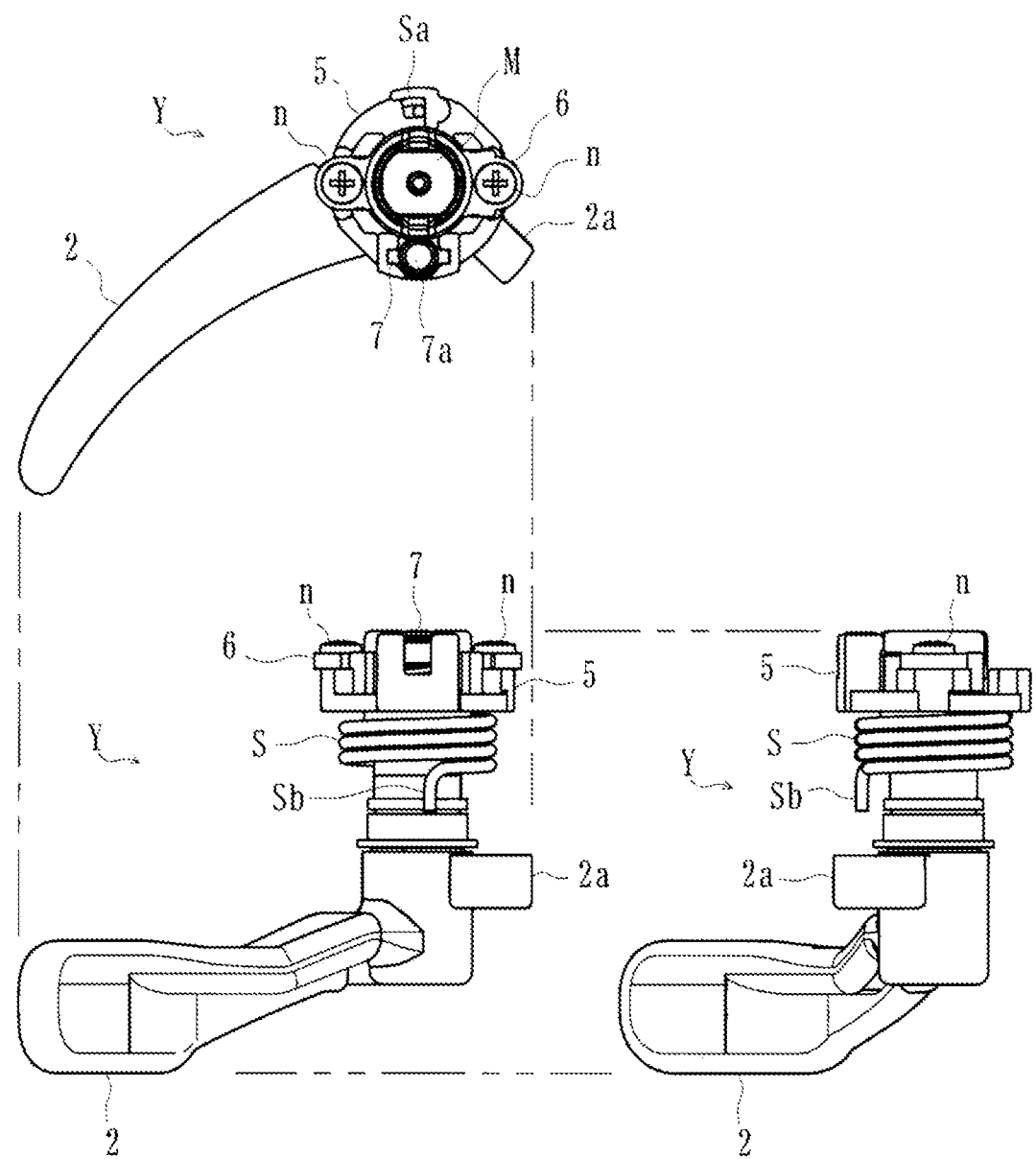
FIG. 7 is a three-view orthographic projection illustrating the throttle lever of the throttle operating device and the integrated component which rotates together with the throttle lever.

The throttle lever 2 is attached so as to extend from a lower side of the fixing member 1 so that a driver can pivot the throttle lever 2 while gripping the grip of the vehicle. As illustrated in FIG. 3, the throttle lever 2 is connected to the shaft member L. The shaft member L rotates around a shaft in response to the rotational operation of the throttle lever 2 and the rotating member 5 is fixed to a tip of the shaft member L by a mounting screw Nb and a washer W. As illustrated in FIG. 7, the throttle lever 2 has a protruding portion 2a protruding laterally. The throttle lever 2 is configured such that the protruding portion 2a is located between the pair of regulating portions 1a-1a in a state of being assembled to the fixing member 1. As a result, rotation angles of the throttle lever 2 and the shaft member L are regulated within a predetermined range.

Figure 6:
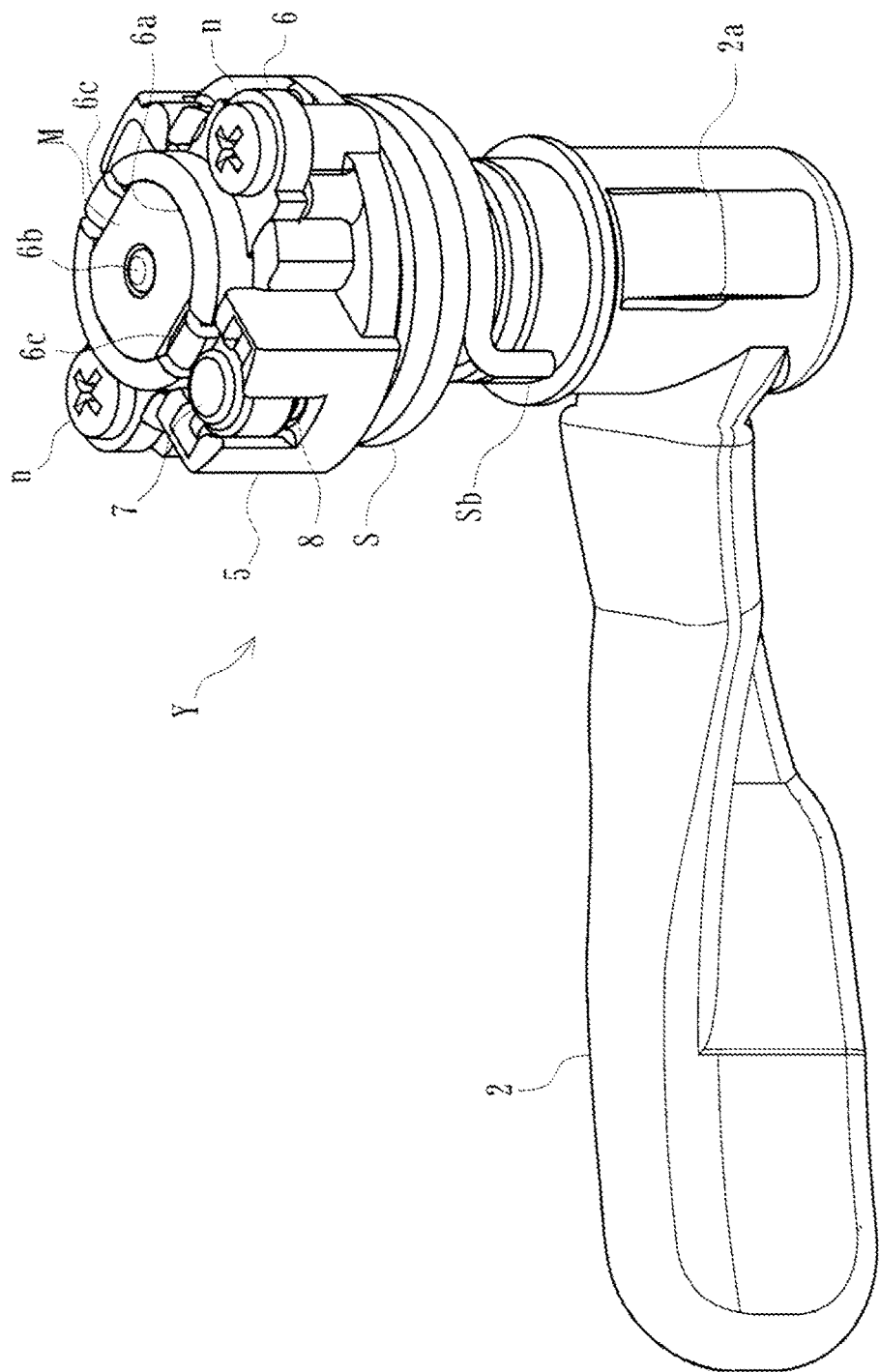
FIG. 6 is a perspective view illustrating a throttle lever of the throttle operating device and an integrated component which rotates together with the throttle lever.

As illustrated in FIGS. 6 and 7, the rotating member 5 is made rotatable in response to the rotational operation of the throttle lever 2. As illustrated in FIG. 9, a mounting portion 5a to which the resistance force applying unit 7 and a coil spring 8 (see FIG. 8) can be attached, a through hole 5b through which a tip of the shaft member L can be inserted, a locking portions 5c for locking one end Sa (see FIG. 8) of the return spring S are formed in the rotating member 5. However, the rotating member 5 is assembled so that one end Sa of the return spring S is locked to the locking portion 5c of the rotating member 5 and the other end Sb is locked to the locking portion 1d of the fixing member 1. Therefore, when the shaft member L and the rotating member 5 are rotated by rotating the throttle lever 2, the rotating member 5 is urged toward an initial position by the return spring S.

Figure 8:
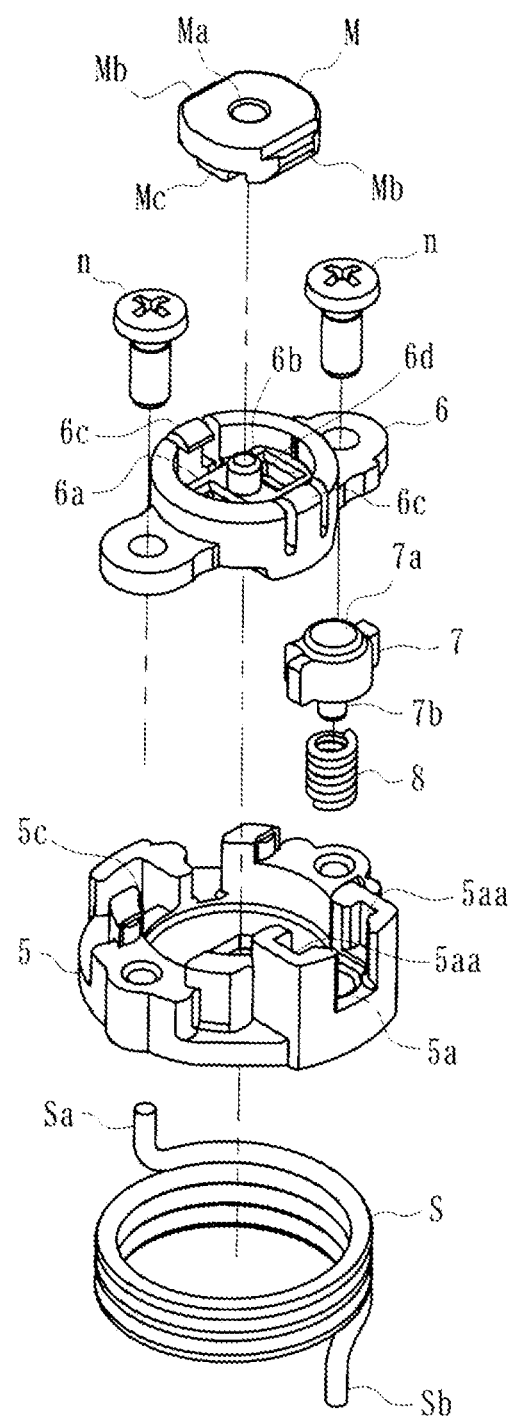
FIG. 8 is an exploded perspective view illustrating an assembled state of the integrated component of the throttle operating device.
Figure 9:
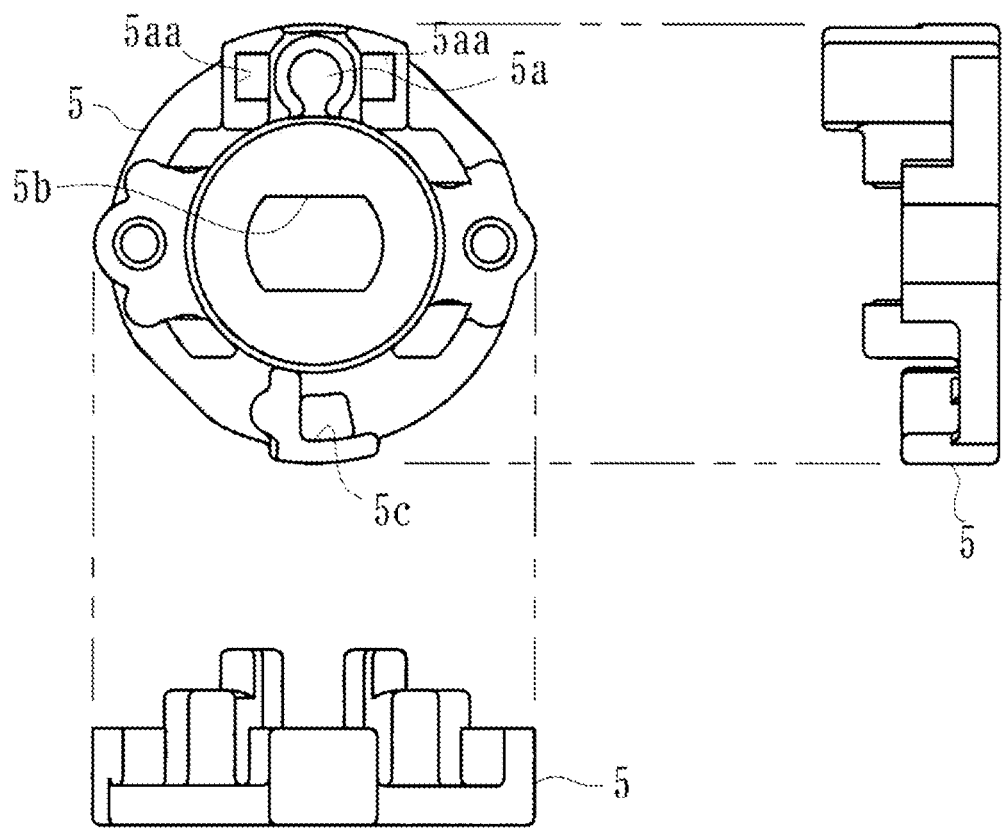
FIG. 9 is a three-view orthographic projection illustrating a rotating member of the throttle operating device.
Figure 10:
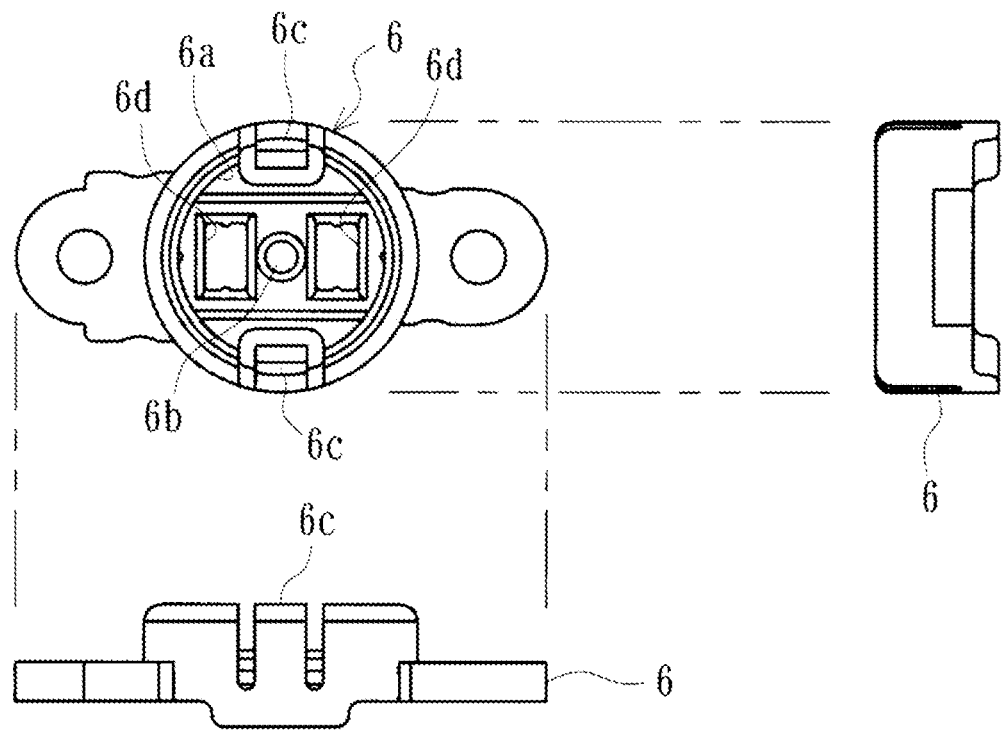
FIG. 10 is a three-view orthographic projection illustrating a mounting member of the throttle operating device.

Further, as illustrated in FIGS. 6 to 8, a mounting member 6 is attached to the rotating member 5 by a pair of mounting screws n. The mounting member 6 holds a magnet M. As illustrated in FIG. 10, the mounting member 6 is configured to include an accommodation recess portion 6a into which a magnet M can be fitted, a central convex portion 6b formed so as to protrude at a center position of a bottom surface of the accommodation recess portion 6a, a pair of locking claws 6c formed so as to face each other at an opening edge of the accommodation recess portion 6a, and a fitting hole 6d formed on the bottom surface of the accommodation recess portion 6a.

Figure 11:
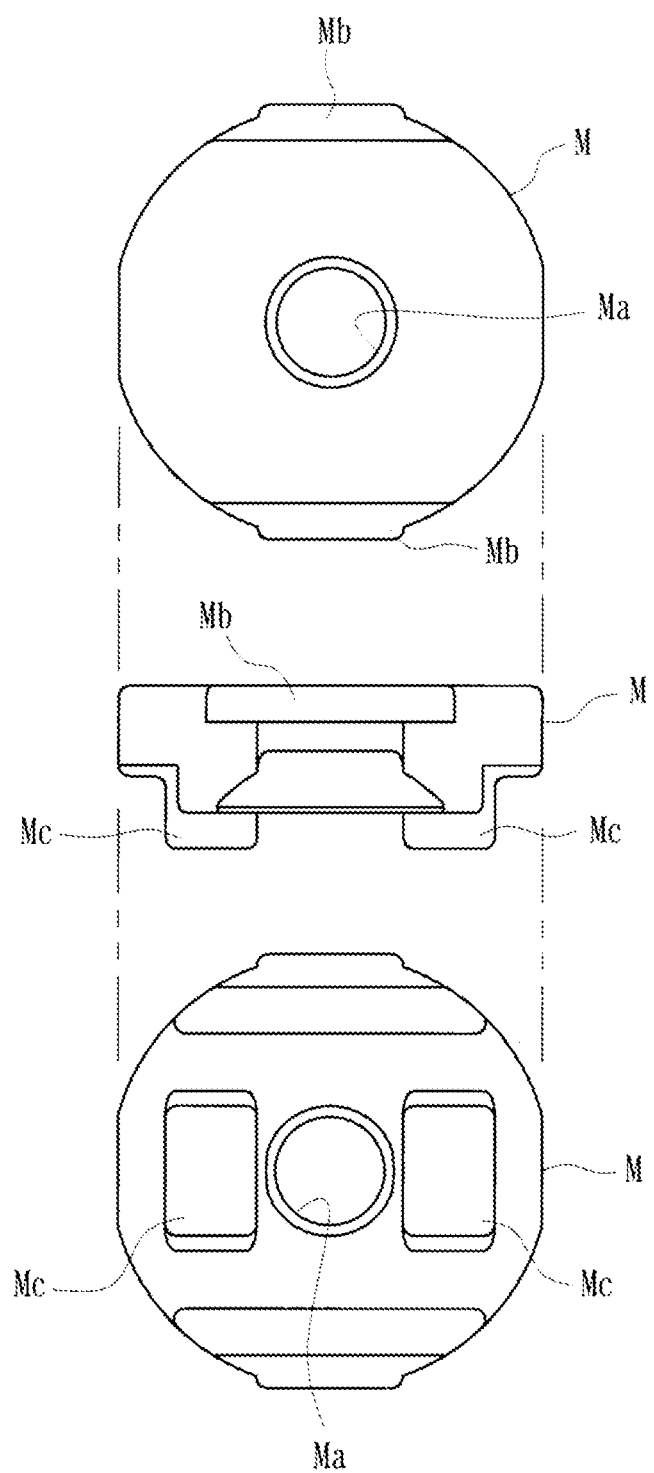
FIG. 11 is a three-view orthographic projection illustrating a magnet of the throttle operating device.

The magnet M is fitted and attached to the accommodation recess portion 6a of the mounting member 6 and can rotate together with the shaft member L in response to the rotational operation of the throttle lever 2. As illustrated in FIG. 11, the magnet M is configured to include a through hole Ma through which the central convex portion 6b can be inserted, a notch portion Mb formed at an upper surface edge, and a pair of protruding portions Mc formed protruding from a lower surface. Then, by fitting the protruding portion Mc into the fitting hole 6d while inserting the central convex portion 6b through the through hole Ma, the magnet M is accommodated in the accommodation recess portion 6a. In addition, the magnet M is prevented from coming off by pressing the locking claw 6c against the notch portion Mb.

As described above, the throttle lever 2, the shaft member L, the rotating member 5, the mounting member 6, the magnet M, and the return spring S are assembled to form an integrated component Y, as illustrated in FIG. 6. Therefore, the integrated component Y is rotated with respect to the fixing member 1 by rotating the throttle lever 2 and the integrated component Y is urged toward the initial position by the return spring S. Therefore, by loosening an operating force on the throttle lever 2, the throttle lever 2 returns to the initial position.

Figure 5:
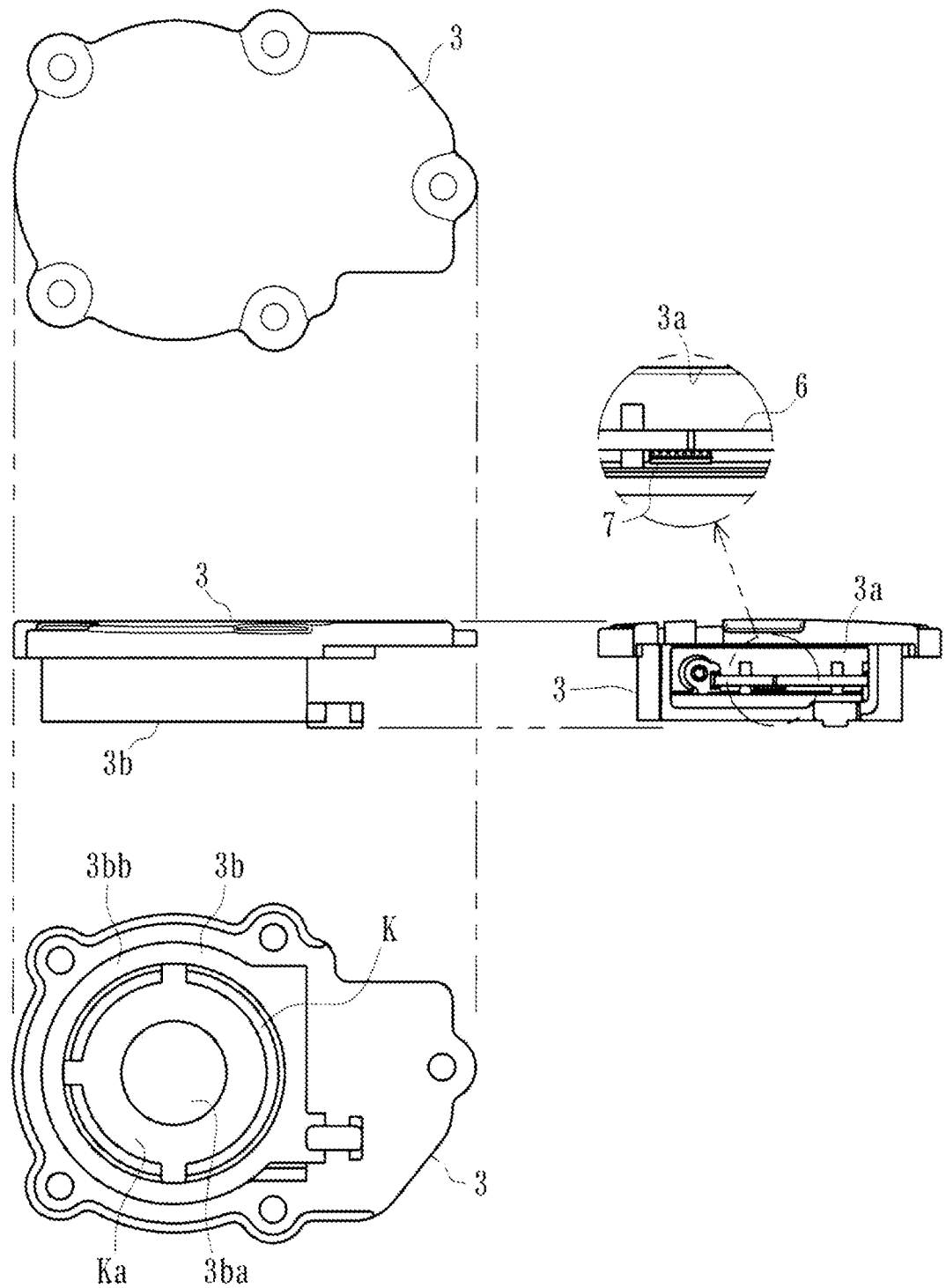
FIG. 5 is a four-view orthographic projection illustrating a cover member of the throttle operating device.

As illustrated in FIGS. 1 to 3, the cover member 3 is fixed by a mounting screw Na while covering an opening at the upper side of the fixing member 1. As illustrated in FIG. 5, the cover member 3 is composed of a molded part having the accommodation recess portion 3a which opens laterally and a lower surface 3b which faces the magnet M while being attached to the fixing member 1. A substrate 10 to which the detection sensor 11 is attached is accommodated in the accommodation recess portion 3b and the detection sensor 11 and the substrate 10 are waterproofed by being filled with a predetermined resin.

Further, in the cover member 3 according to the present embodiment, the sliding member K is fixed to the lower surface 3b of the cover member 3 by insert-molding. The sliding member K is made of an annular metal member and is configured so that the resistance force applying unit 7, which will be described below, can slide. An inner region of the sliding member K on the lower surface 3b of the cover member 3 forms an abutment surface 3ba with which the magnet M is in contact and on which the magnet M can rotate, so that the magnet M can be rotated stably.

Further, the cover member 3 can perform sealing by pressing the sealing member 9 while being attached to the fixing member 1. That is, when the cover member 3 is attached to the fixing member 1, as illustrated in FIG. 3, a pressing surface 3bb formed in a peripheral edge region of the lower surface 3b of the cover member 3 presses the sealing member 9, and thus the inside (an internal space where the rotating member 5 and the like are located) of the fixing member 1 can be sealed.

The detection sensor 11 can detect the rotational operation angle of the throttle lever 2. In the present embodiment, the detection sensor 11 is composed of an angle sensor which detects the magnetic change of the magnet M and detects the rotation angle thereof. That is, when the magnet M rotates with the rotational operation of the throttle lever 2, the detection sensor 11 detects the magnetic change of the magnet M due to the rotation and the rotational operation angle of the throttle lever 2 can be detected.

When the detection sensor 11 detects the rotational operation angle of the throttle lever 2, the detection signal is transmitted to an engine control unit (ECU) provided in the vehicle via a wiring h connected to the substrate 10 and an engine (drive source) of the vehicle is controlled based on the rotational operation angle of the throttle lever 2.

Further, the throttle operating device according to the present embodiment is provided with the resistance force applying unit 7 which can generate friction during the rotational operation of the throttle lever 2 to apply a resistance force. As illustrated in FIGS. 6 to 8, such resistance force applying unit 7 is attached to the mounting portion 5*a* of the rotating member 5 and is composed of a resin member urged upward by the coil spring 8. When the rotating member 5 rotates with the rotational operation of the throttle lever 2, the resistance force applying unit 7 can pivot together with the rotating member 5.

Figure 12:
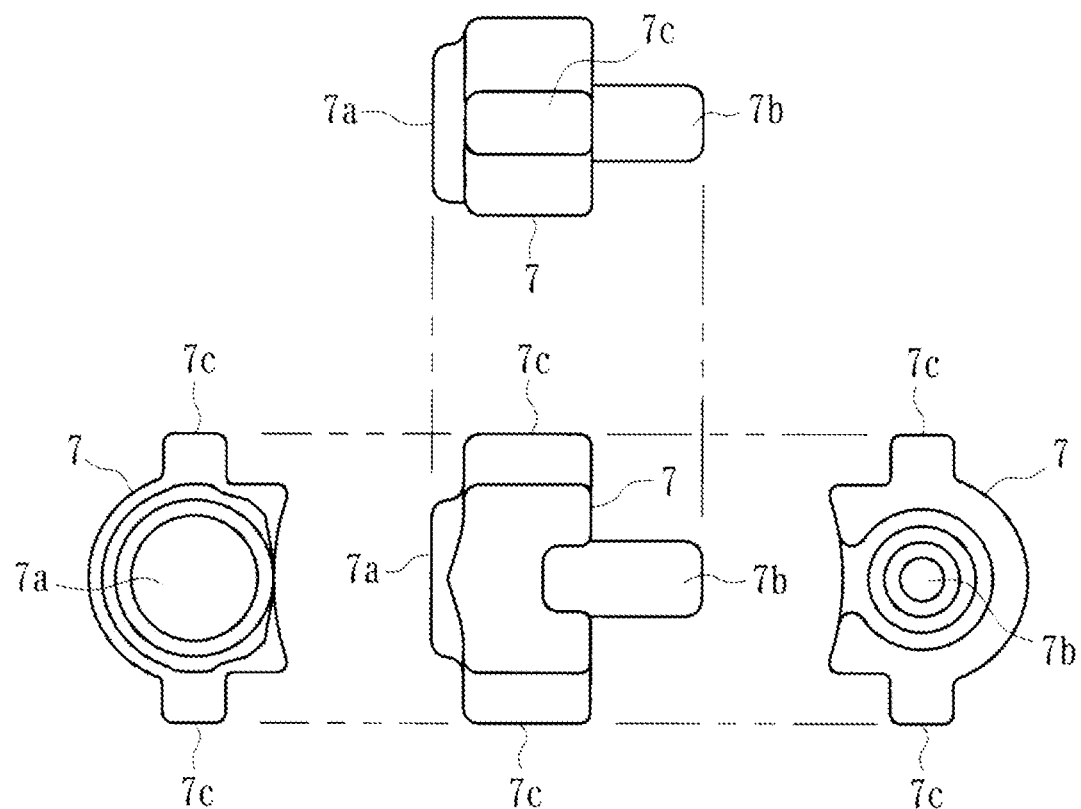
FIG. 12 is a four-view orthographic projection illustrating a resistance force applying unit of the throttle operating device.

Specifically, in the resistance force applying unit 7, as illustrated in FIG. 12, a protruding end surface 7*a*, a boss portion 7*b*, and protruding portions 7*c* are integrally formed. The protruding end surface 7*a* is composed of a plane formed at the protruding end of the resistance force applying unit 7 and is composed of a surface capable of sliding on a sliding surface Ka of the sliding member K formed on the cover member 3. The boss portion 7*b* has a protruding shape formed on a lower surface of the resistance force applying unit 7 and is capable of holding the coil spring 8. Further, the protruding portions 7*c* are composed of a pair of bulging portions formed on side surfaces of the resistance force applying unit 7. By matching the protruding portion 7*c* with a holding groove 5*aa* (see FIGS. 8 and 9) formed in the mounting portion 5*a* of the rotating member 5, the resistance force applying unit 7 can be positioned and the displacement of the resistance force applying unit 7 can be guided.

Figure 13:
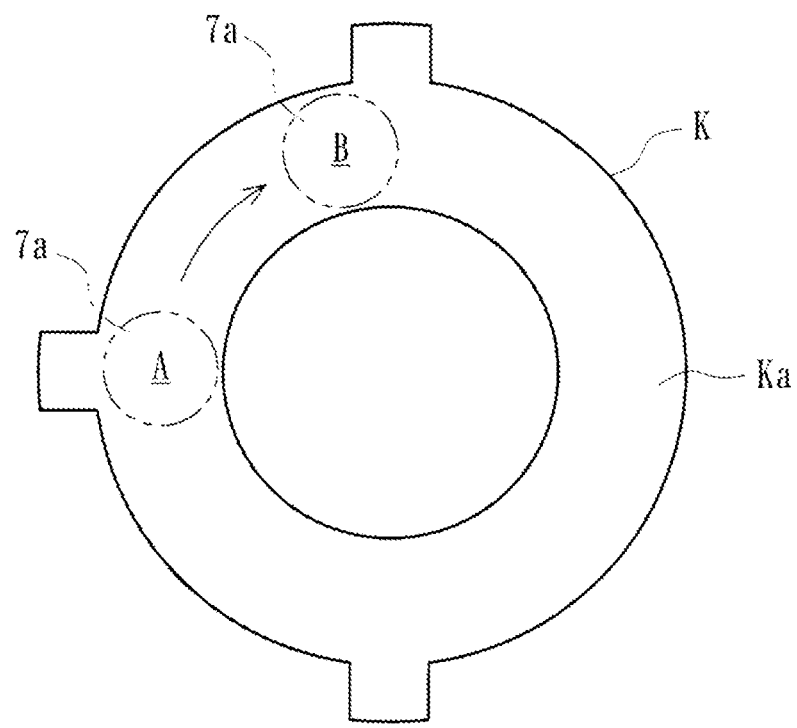
FIG. 13 is a schematic view illustrating sliding of the resistance force applying unit of the throttle operating device with respect to a sliding member.

However, the resistance force applying unit 7 is urged by the coil spring 8 toward the sliding surface Ka of the sliding member K, and as illustrated in FIG. 3, the protruding end surface 7*a* is in contact with the sliding surface Ka. When the rotating member 5 rotates with the rotational operation of the throttle lever 2 and the resistance force applying unit pivots together with the rotating member 5, as illustrated in FIG. 13, the protruding end surface 7*a* in contact with a position A can slide to a position B. That is, the sliding surface Ka formed on the cover member 3 is composed of a surface of the sliding member K formed along a movement locus of the resistance force applying unit 7. Therefore, in a process of sliding the protruding end surface 7*a* from the position A to the position B, friction can be generated to apply resistance.

According to the present embodiment, by providing the resistance force applying unit 7 which can generate friction and apply a resistance force during the rotational operation of the throttle lever 2, the operability at the time of the rotational operation of the throttle lever 2 can be improved and the operation feeling can be made similar, compared with the one of the related art in which an operation of a throttle lever is transmitted to an engine side via an operation wire.

Further, the detection sensor 11 is attached at a position corresponding to the magnet M and can detect the rotational operation angle of the throttle lever 2 based on the magnetic change of the magnet M which rotates according to the throttle lever 2. Therefore, the detection sensor 11 can accurately detect the rotational operation angle of the throttle lever 2. In particular, the detection sensor 11 according to the present embodiment can detect the rotational operation angle of the throttle lever 2 based on the magnetic change of the magnet M rotating according to the throttle lever 2 and is attached to the cover member 3 at a position corresponding to the magnet M. Therefore, the cover member 3 has a function of covering the opening of the fixing member 1 and a function of attaching the detection sensor 11, and it is possible to easily take waterproof measures for a portion (in particular, accommodation recess portion 3*a*) to which the detection sensor 11 is attached.

Moreover, in the present embodiment, the rotating member 5 which is connected to the shaft member L and rotates in response to the rotational operation of the throttle lever 2 is provided and the resistance force applying unit 7 is attached to the rotating member 5. Therefore, the resistance force applying unit 7 can smoothly apply the resistance force by the rotation of the rotating member 5 and the throttle operating device can be miniaturized. In particular, the resistance force applying unit 7 related to the present embodiment is attached to the rotating member 5 and generates friction by sliding on the sliding surface Ka (in the present embodiment, the sliding surface Ka of the sliding member K) formed on the cover member 3. Therefore, in addition to the function of covering the opening of the fixing member 1 and the function of attaching the detection sensor 11, the cover member 3 can have a function of holding the sliding surface Ka for the resistance force applying unit 7.

Further, in the present embodiment, the cover member 3 covering the opening of the fixing member 1 is provided and the sliding surface Ka is formed on the cover member 3, and further the sliding surface Ka is composed of a surface of the sliding member K formed along the movement locus of the resistance force applying unit 7. Therefore, the cover member 3 can have the function of covering the opening of the fixing member 1 and the function of holding the sliding surface Ka for the resistance force applying unit 7, and further the cover member 3 can make the resistance force applying unit 7 slide reliably along the sliding surface Ka. Furthermore, the resistance force applying unit 7 according to the present embodiment is composed of a resin member urged toward the sliding surface Ka by the coil spring 8 (urging unit) attached to the rotating member 5 and the sliding member K is composed of a metal member insert-molded into the cover member 3. Therefore, the frictional force due to the resistance force applying unit 7 can be stably generated.

According to the present embodiment, the sealing member 9 for sealing the inside of the fixing member 1 is provided and the cover member 3 can perform sealing by pressing the sealing member 9 while being attached to the fixing member 1. Therefore, in addition to the function of covering the opening of the fixing member 1 and the function of attaching the detection sensor 11, the cover member 3 can have a function of maintaining the sealing by the sealing member 9.

In addition, the detection sensor 11 according to the present embodiment is attached to the cover member 3 at the position corresponding to magnet M. Therefore, the cover member 3 can have the function of covering the opening of the fixing member 1 and the function of attaching the detection sensor 11, and further the throttle operating device can be miniaturized and the number of parts can be reduced.

Hereinafter, a throttle operating device according to a second embodiment of the invention will be described.

Figure 14:
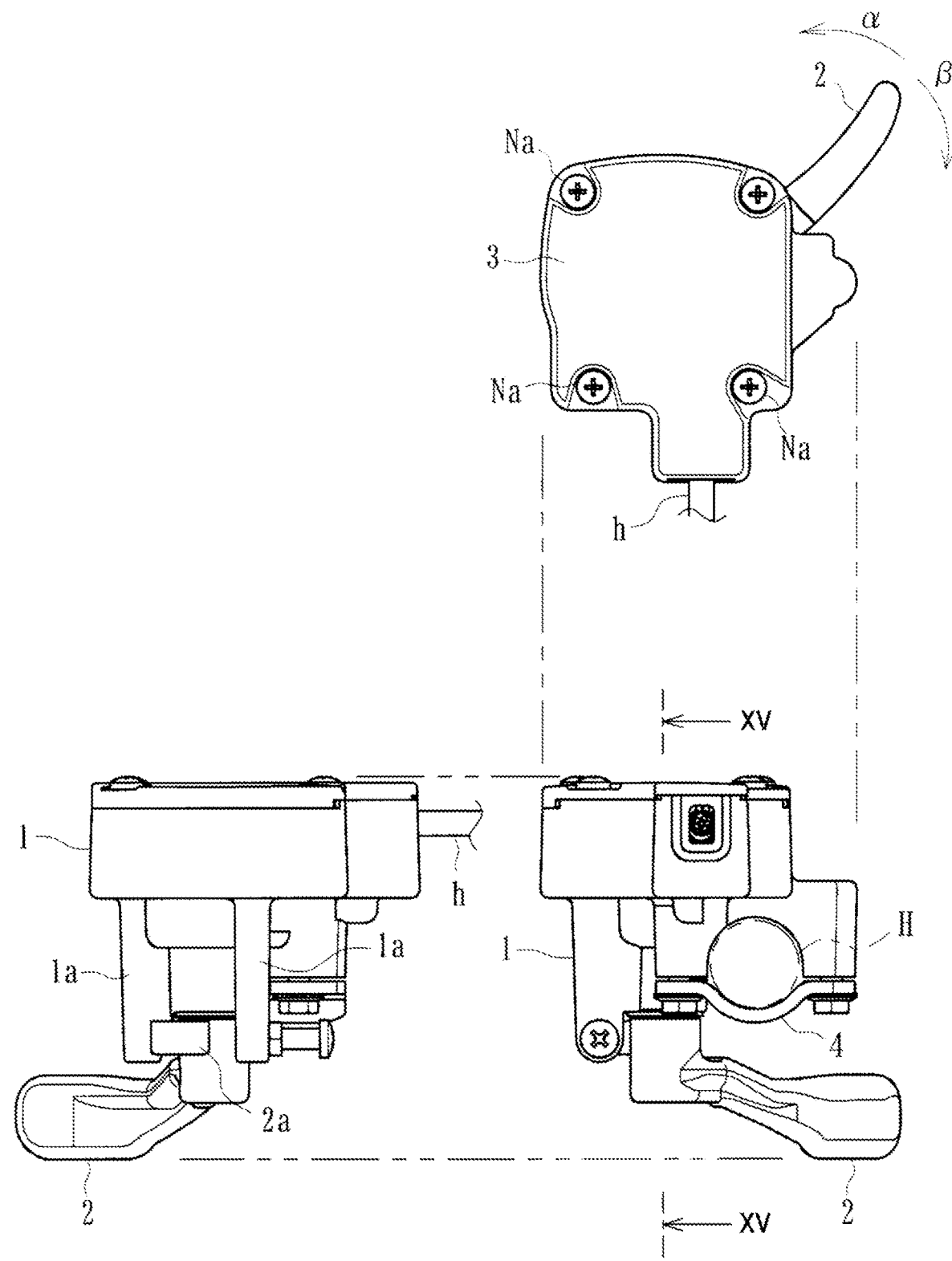
FIG. 14 is an overall perspective view illustrating a throttle operating device according to a second embodiment of the invention.
Figure 15:
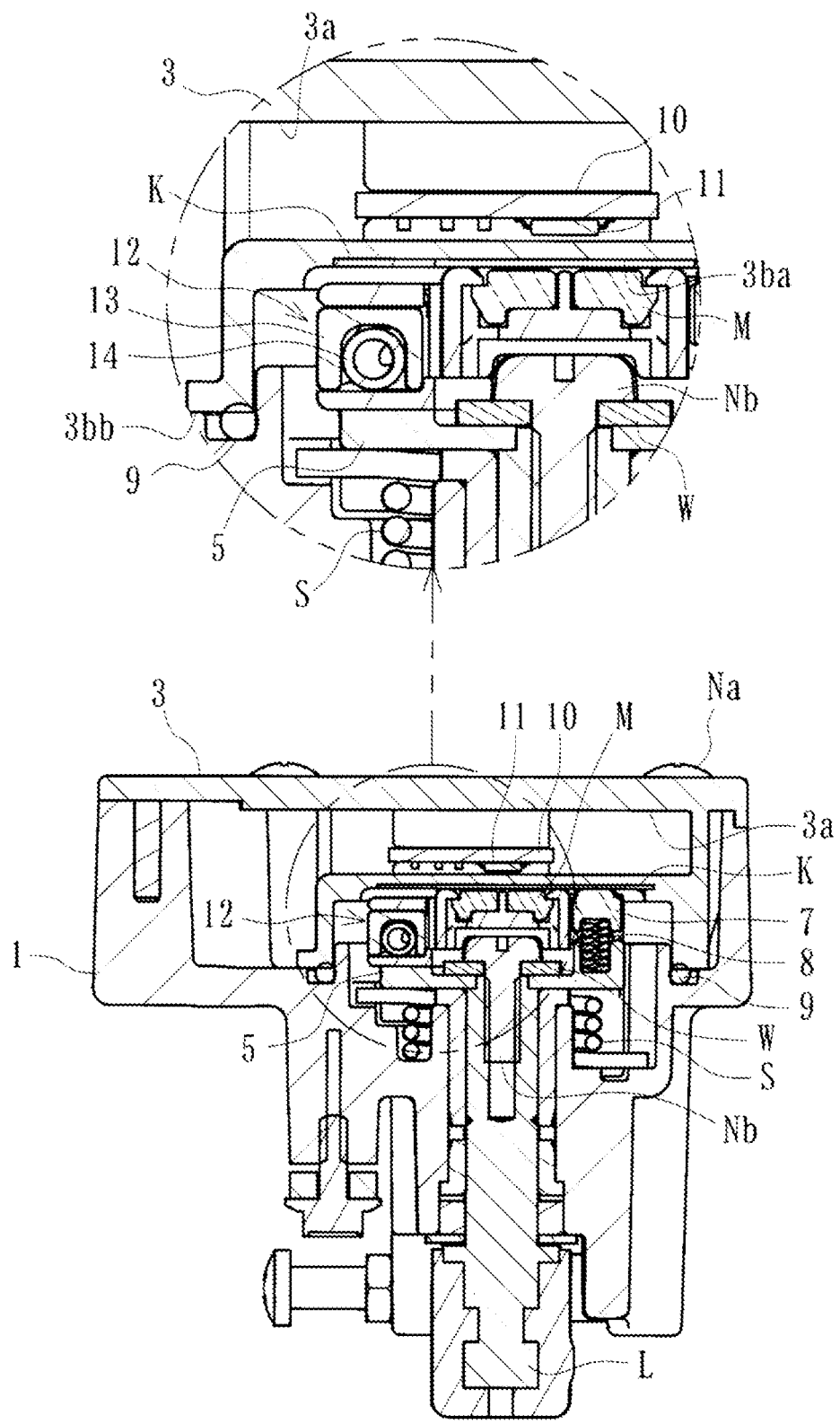
FIG. 15 is a cross-sectional view taken along the line XV-XV of FIG. 14.

As similar to that of the first embodiment, the throttle operating device according to the second embodiment is fixed to a handlebar of a car such as an ATV or a buggy, a ship such as a PWC (personal watercraft), or a vehicle (in the present embodiment, a car such as an ATV or a buggy) such as a snow vehicle so that an engine (drive source) of the car can be controlled. As illustrated in FIGS. 14 and 15, the throttle operating device is configured to include the fixing member 1, the throttle lever 2 which is a so-called thumb lever, the cover member 3, the rotating member 5, the resistance force applying unit 7, the detection sensor 11, the return spring S, the sliding member K, and an operating load generating unit 12. Except for parts described separately in the present embodiment, the parts common to those of the first embodiment are designated by the same reference numerals and letters and detailed description thereof will be omitted.

Figure 16:
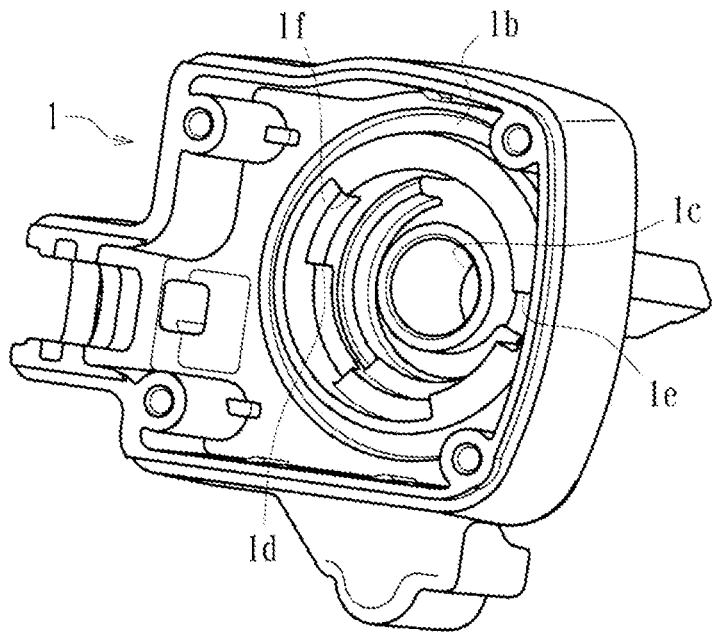
FIG. 16 is a three-view orthographic projection illustrating a fixing member of the throttle operating device.
Figure 17:
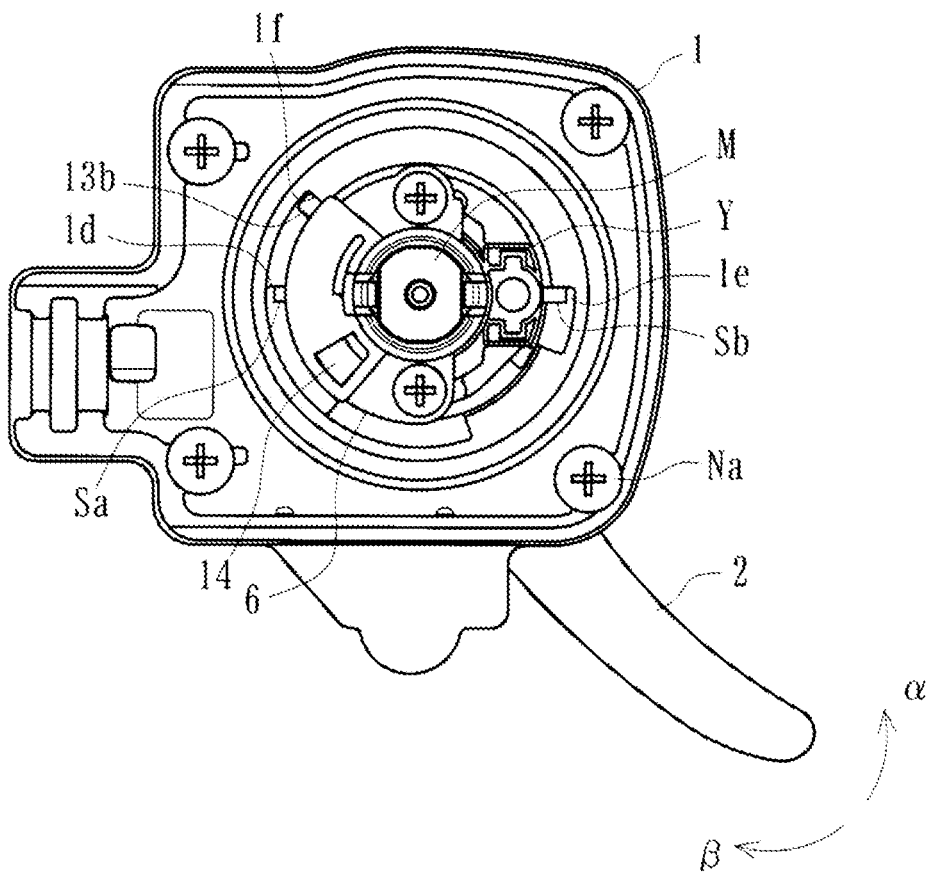
FIG. 17 is a plan view illustrating a state in which an integrated component is attached to the fixing member.
Figure 18:
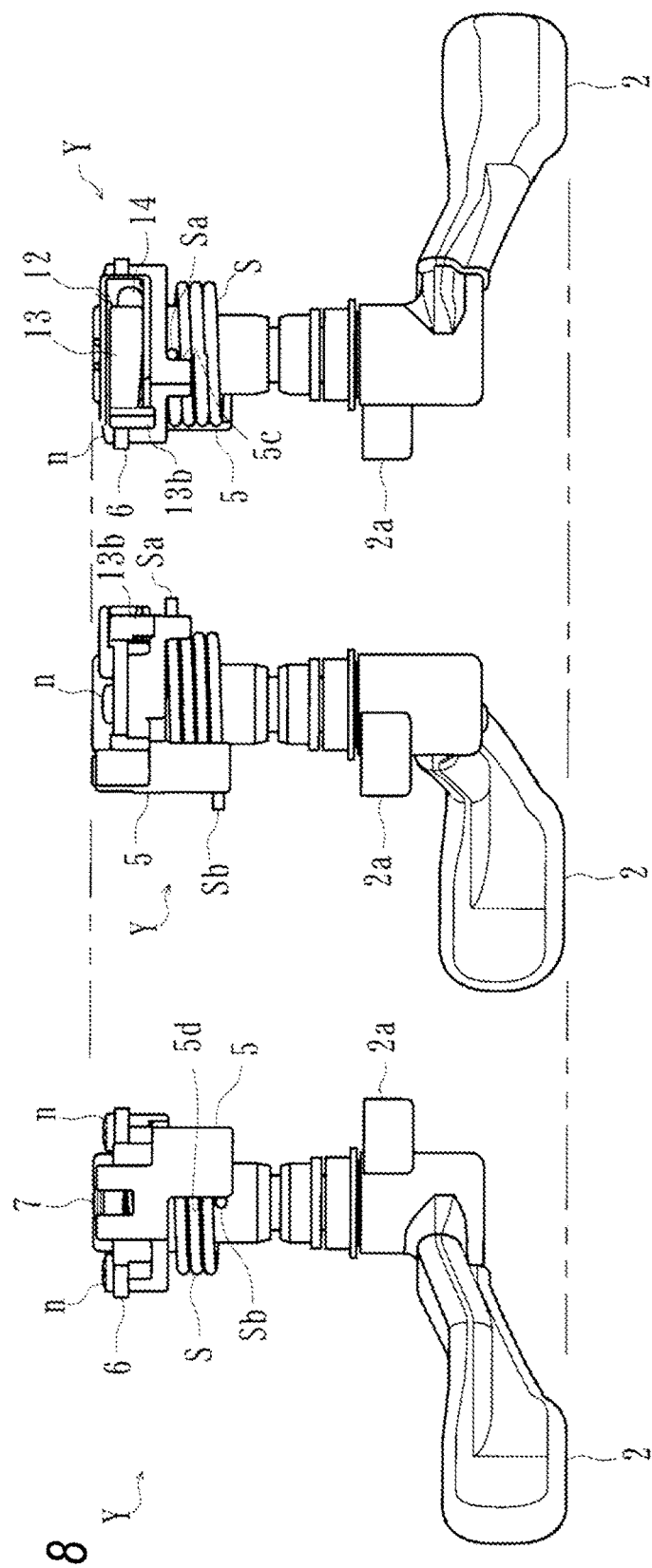
FIG. 18 is a three-view orthographic projection illustrating the same component.

The fixing member 1 is fixed to the handlebar H to pivotally support the throttle lever 2 and is fixed to the vicinity of the grip formed at the tip of the handlebar H of the car. As illustrated in FIGS. 16 and 17, the fixing member 1 has the opening at the upper side to form the accommodation recess portion inside and the pinching member 4 is attached to the fixing member 1. The fixing member 1 can be fixed by pinching the handlebar H with the pinching member 4.

Also, the mounting groove 1b for fitting and positioning the sealing member 9 (see FIG. 15), the through hole 1c through which the shaft member L is inserted to allow a rotational operation of the throttle lever 2, a first fixing portion 1d which locks and fixes one end Sa (see FIGS. 21 to 23) of the return spring S, a second fixing portion 1e which locks and fixes the other end Sb (see FIGS. 21 to 23) of the return spring S, and a third fixing portion if which locks and fixes a pressed portion 13b (see FIGS. 25A to 27) of the operating load generating unit 12 are formed on a bottom surface of the accommodation recess portion formed inside the fixing member 1.

Here, as similar to that of the first embodiment, the throttle operating device according to the present embodiment is configured such that the throttle lever 2 can be pivoted in a forward direction α and a reverse direction β with respect to the fixing member 1, and the detection sensor 11 is attached to the cover member 3 at the position corresponding to the magnet M and can detect rotational operations of the throttle lever 2 in the forward direction α and the reverse direction β. Also, the throttle operating device is configured such that the engine (drive source) of the car can be controlled by the rotational operation in the forward direction α and a predetermined device mounted on the car can be operated or the operation of the device can be stopped by the rotational operation in the reverse direction β.

Figure 19:
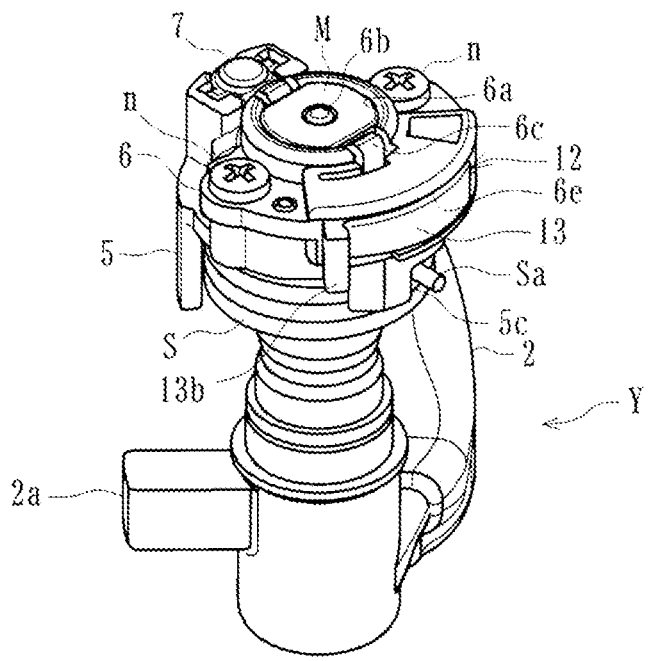
FIG. 19 is a perspective view illustrating the same component.
Figure 20:
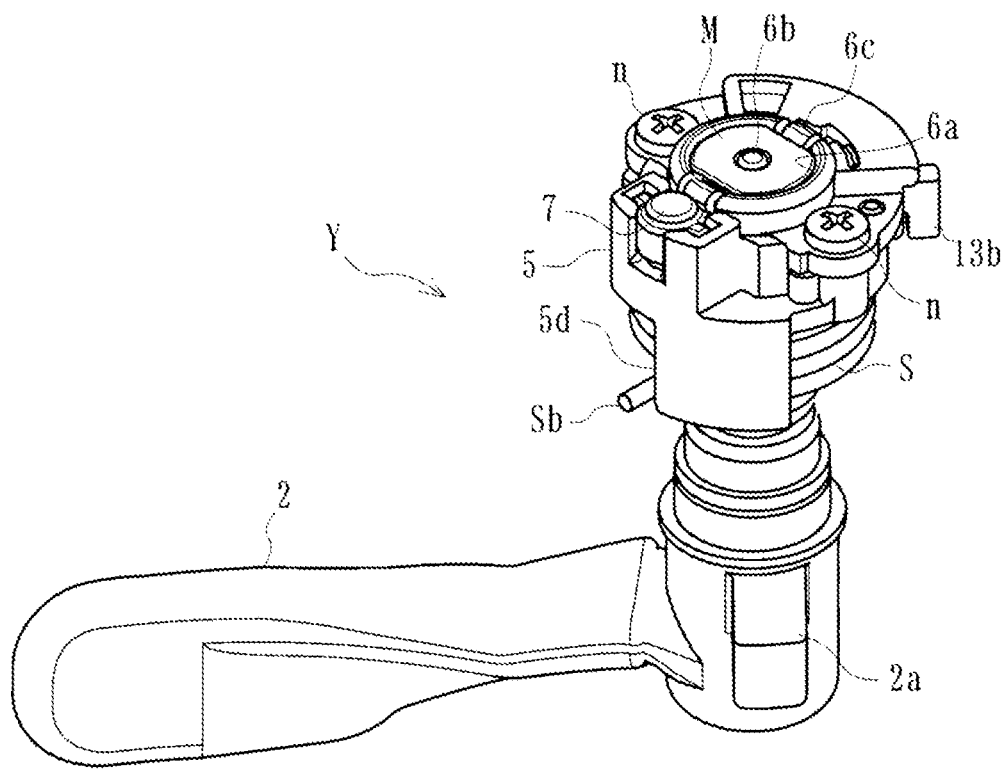
FIG. 20 is a perspective view illustrating the same component.

Further, the return spring S is assembled such that one end Sa of the return spring S can be locked to a first locking portion 5c (see FIGS. 19 and 23) of the rotating member 5 and a first fixing portion 1d (see FIGS. 16 and 17) of the fixing member 1 and the other end Sb can be locked to a second locking portion 5d (see FIGS. 20 and 23) of the rotating member 5 and the second fixing portion 1e (see FIGS. 16 and 17) of the fixing member 1. Then, when the throttle lever 2 is rotated in the forward direction α and the rotating member 5 rotates in the same direction, one end Sa of the return spring S is locked to the first locking portion 5c and pivots in response to the rotation of the rotating member 5 and the other end Sb is locked and fixed to the second fixing portion 1e of the fixing member 1. Therefore, an urging force is applied in a direction of returning the throttle lever 2 to the initial position.

Also, when the throttle lever 2 is rotated in the reverse direction β and the rotating member 5 rotates in the same direction, the other end Sb of the return spring S is locked to the second locking portion 5d and pivots in response to the rotation of the rotating member 5 and one end Sa is locked and fixed to the first fixing portion 1d of the fixing member 1. Therefore, an urging force is applied in a direction of returning the throttle lever 2 to the initial position.

However, the throttle operating device according to the present embodiment includes the operating load generating unit 12 which generates a predetermined operating load when the throttle lever is rotated in the reverse direction β and does not generate an operating load when the throttle lever 2 is rotated in the forward direction α. As a result, the operating load in the reverse direction β of the throttle lever 2 is set to be larger than the operating load in the forward direction α.

Figure 21:
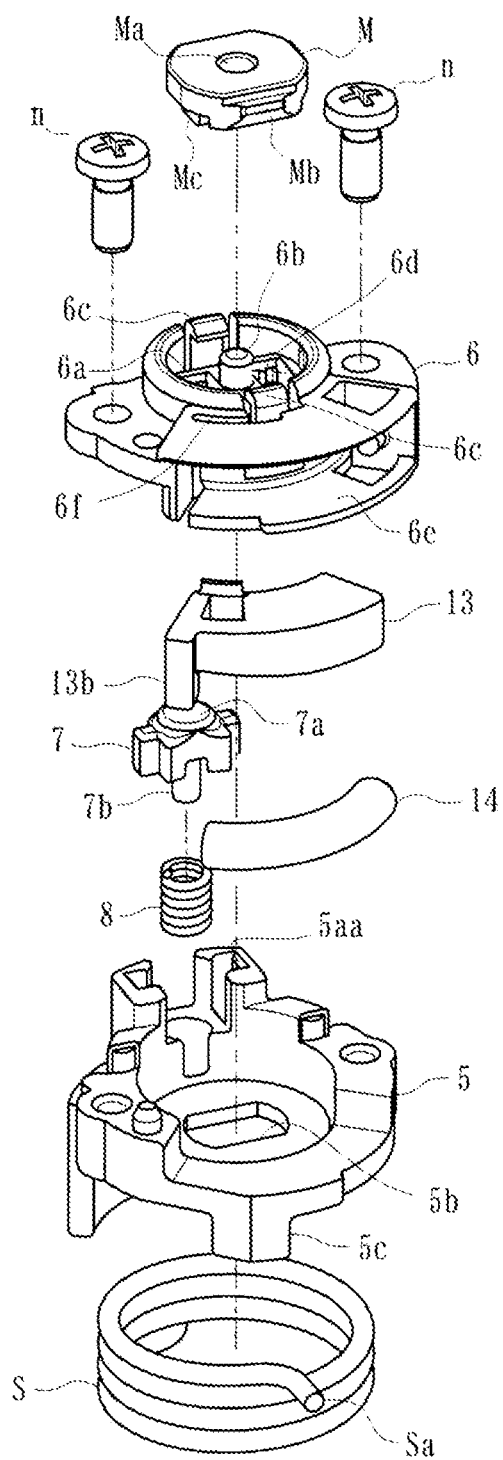
FIG. 21 is an exploded perspective view illustrating an assembled state of a tip portion of the integrated component in the throttle operating device.
Figure 22:
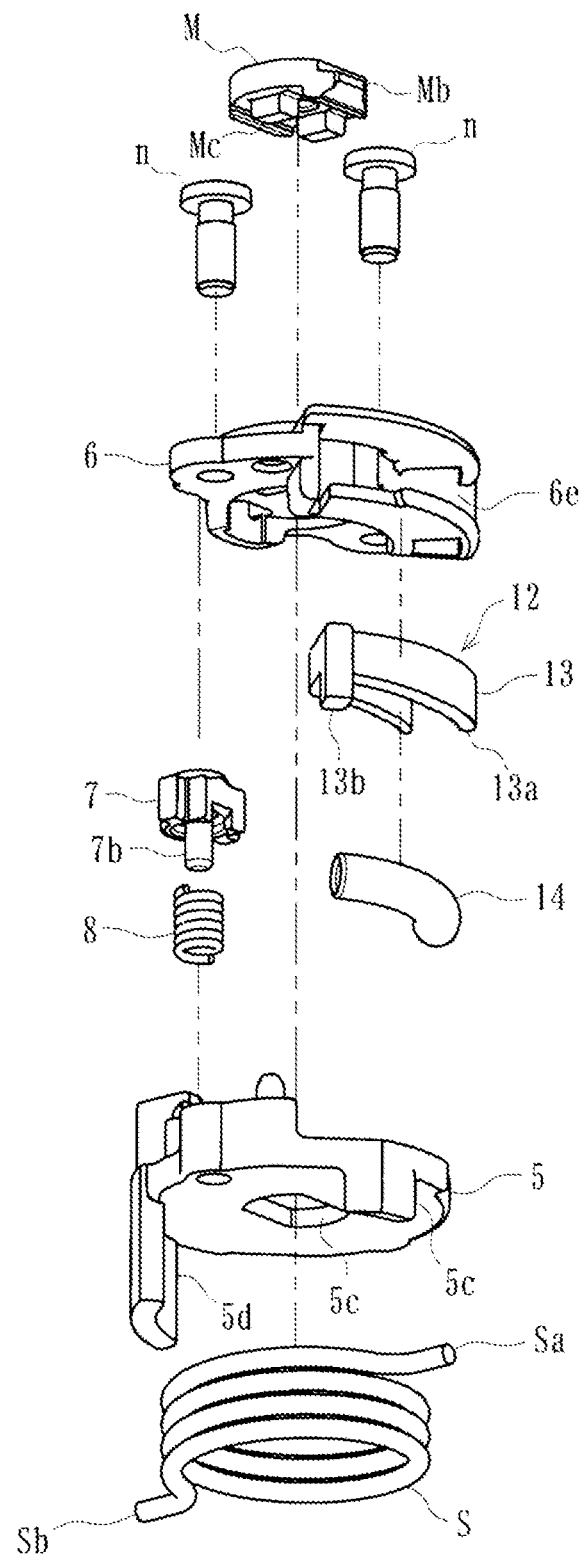
FIG. 22 is an exploded perspective view illustrating the assembled state of the tip portion of the integrated component in the throttle operating device.
Figure 23:
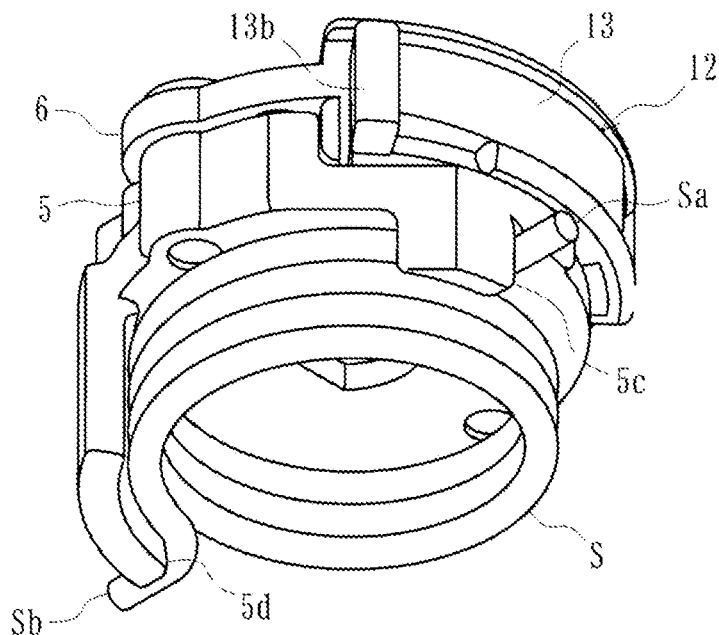
FIG. 23 is a perspective view illustrating the assembled state of the tip portion of the integrated component in the throttle operating device.
Figure 24:
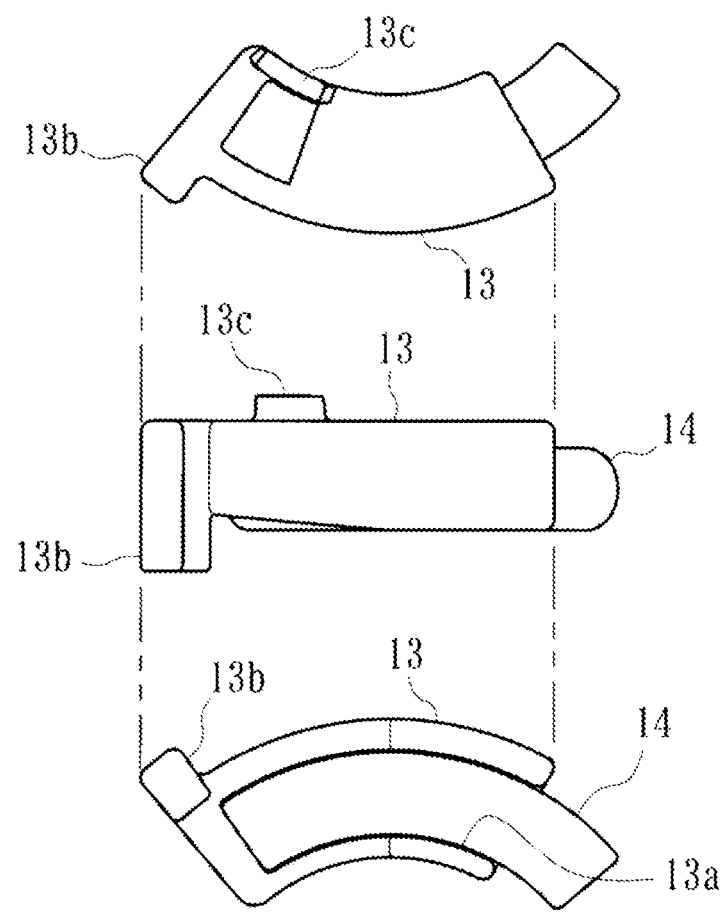
FIG. 24 is a three-view orthographic projection illustrating a resistance force applying unit of the throttle operating device.
Figure 25A:
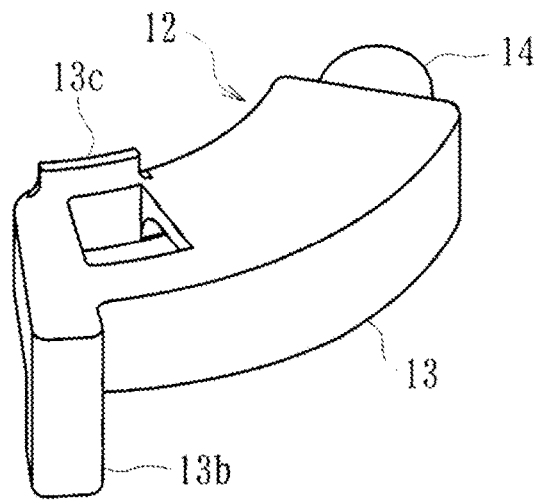
FIGS. 25A and 25B are perspective views illustrating the resistance force applying unit of the throttle operating device.
Figure 25B:
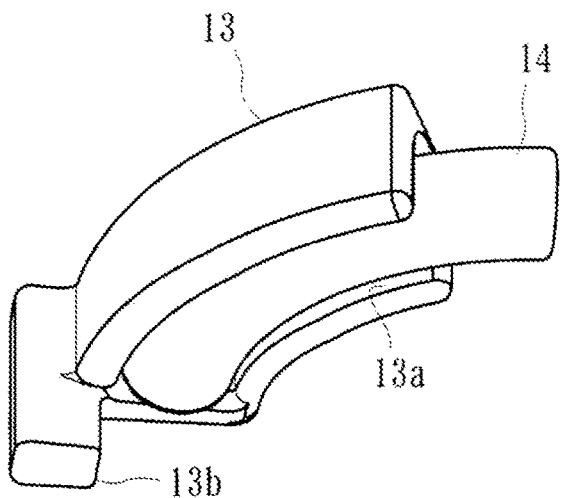
Figure 26:
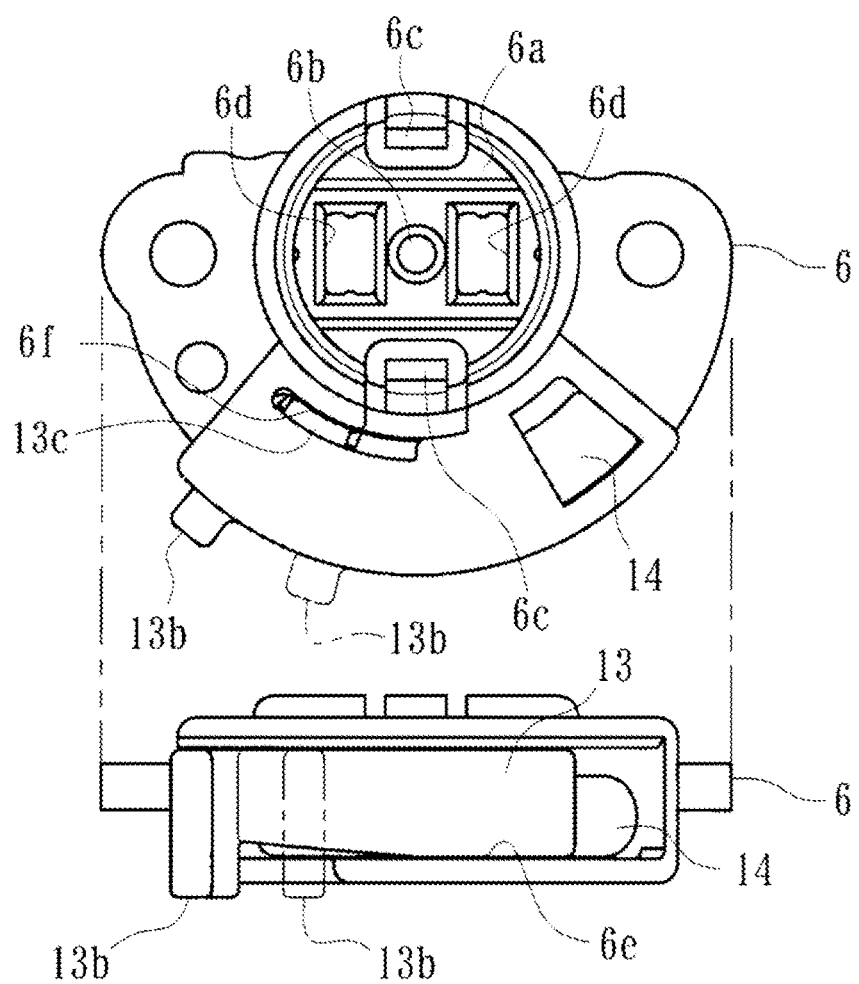
FIG. 26 is a plan view and a front view illustrating a mounting member in a state where the resistance force applying unit is attached.

As illustrated in FIGS. 21, 22, and 26, the operating load generating unit 12 is attached to a mounting groove portion 6e formed in the mounting member 6 and can rotate together with the rotating member 5 to generate an operating load. Therefore, as illustrated in FIGS. 24, 25A and 25B, the operating load generating unit 12 includes a displacement unit 13 which is displaced in response to the rotational operation of the throttle lever 2 in the reverse direction and an urging unit 14 which generates an urging force in response to the displacement of the displacement unit 13.

The displacement unit 13 is composed of a member extending in an arc shape along the rotation direction of the mounting member 6. The displacement unit 13 includes an accommodation recess portion 13a accommodating the urging unit 14, the pressed portion 13b protruding laterally, and a protruding portion 13c protruding upward. The urging unit 14 is composed of a coil spring extending in an arc shape and is accommodated in the accommodation recess portion 13a formed in an arc shape. Further, as illustrated in FIG. 26, the mounting member 6 has an insertion groove 6f formed in an arc shape. When the displacement unit 13 to which the urging unit 14 is attached is attached to the mounting groove portion 6e of the mounting member 6, the protruding portion 13c is inserted into the insertion groove 6f formed in the mounting member 6.

Then, when the throttle lever 2 is operated in the reverse direction β and the integrated component Y rotates in the same direction, and further the mounting member 6 rotates in the reverse direction β, as illustrated in FIG. 17, the pressed portion 13b of the displacement unit 13 abuts on the third fixing portion 1f, and thus the displacement unit 13 is displaced (see the alternate long and short dash line in FIG. 26) relative to the mounting member 6 and the urging unit 14 is compressed. As a result, when the throttle lever 2 is rotated in the reverse direction β, a predetermined operating load can be generated by the urging force of the urging unit 14. When the displacement unit 13 is displaced with respect to the mounting member 6, the protruding portion 13c of the displacement unit 13 moves along the insertion groove 6f, so that stable displacement can be performed.

On the other hand, when the throttle lever 2 is operated in the forward direction α and the integrated component Y rotates in the same direction, and further the mounting member 6 rotates in the forward direction α, the displacement unit 13 and the urging unit 14 rotate following the mounting member 6, and thus the displacement (relative displacement) is not performed with respect to the mounting member 6 and the urging unit 14 is not compressed. As a result, when the throttle lever 2 is rotated in the forward direction α, the urging force of the urging unit 14 is not generated and the operating load due to the operating load generating unit 12 is not generated. When the throttle lever 2 is operated in the forward direction α, the operating load due to the operating load generating unit 12 is not generated, but as described above, the operating load due to the urging force of the return spring S is generated.

Further, in the present embodiment, the throttle operating device includes the return spring S which urges the throttle lever 2 to the initial position when the throttle lever 2 is rotated in the forward direction α and the reverse direction β. Therefore, when the throttle lever 2 is rotated in the reverse direction β, both the urging force due to the return spring S and the operating load due to the operating load generating unit 12 are generated at the same time. That is, when the throttle lever 2 is rotated in the reverse direction β, the urging force due to the return spring S and the operating load due to the operating load generating unit 12 are added and the combined force thereof is applied as the operating load.

Figure 27:
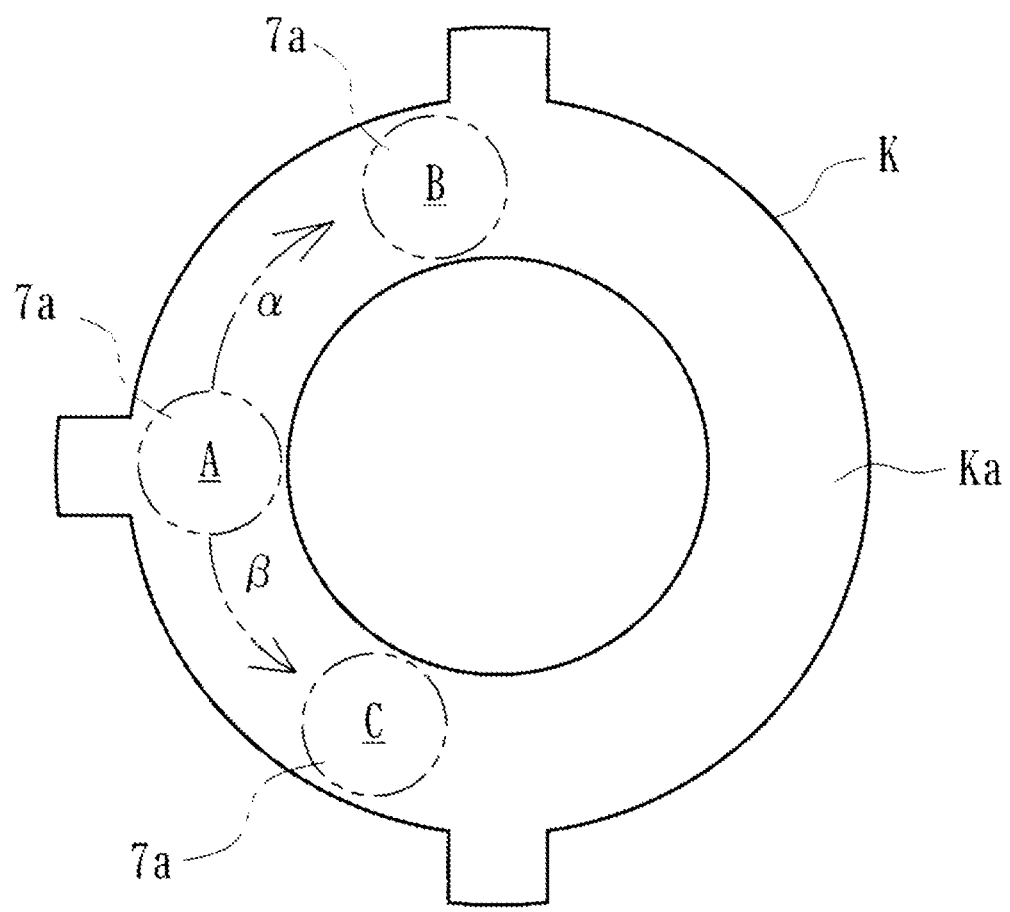
FIG. 27 is a schematic view illustrating sliding of the resistance force applying unit of the throttle operating device with respect to a sliding member.

However, the resistance force applying unit 7 is urged by the coil spring 8 toward the sliding surface Ka of the sliding member K and the protruding end surface 7a is in contact with the sliding surface Ka. Further, the rotating member 5 rotates with the rotational operation of the throttle lever 2 and the resistance force applying unit 7 rotates together with the rotating member 5. Then, as illustrated in FIG. 27, when the throttle lever 2 is rotated in the forward direction α, the protruding end surface 7a in contact with the position A can slide to the position B, and when the throttle lever 2 is rotated in the reverse direction β, the protruding end surface 7a in contact with the position A can slide to a position C. That is, the sliding surface Ka formed on the cover member is composed of the surface of the sliding member K formed along the movement locus of the resistance force applying unit 7. Therefore, in the process of sliding the protruding end surface 7a from the position of A to the position B or the position of C, friction can be generated and a resistance force can be applied.

According to the present embodiment, the throttle lever 2 can be pivoted in the forward direction α and the reverse direction β and the operating load in the reverse direction is set to be larger than the operating load in the forward direction α. Therefore, when operating the throttle lever 2 in the forward direction α, it is possible to prevent an accidental operation in the reverse direction β. In particular, the throttle lever 2 according to the present embodiment can control the drive source (engine) of the car by pivoting in the forward direction α and can operate a predetermined device mounted on the car or stop the operation of the device by pivoting in the reverse direction β. Therefore, by rotating the throttle lever 2, in addition to the throttle control, other devices possessed by the car can be smoothly operated.

Further, according to the present embodiment, the throttle operating device includes the operating load generating unit 12 which generates a predetermined operating load when the throttle lever 2 is rotated in the reverse direction β and does not generate an operating load when the throttle lever 2 is rotated in the forward direction α. Therefore, the operating load in the reverse direction β in the throttle lever 2 can be set to be larger than the operating load in the forward direction α.

Further, since the operating load generating unit 12 can rotate together with the rotating member 5 and generate an operating load, the operating load can be reliably generated when the throttle lever 2 is operated in the reverse direction β. Furthermore, the operating load generating unit 12 according to the present embodiment includes the displacement unit 13 which is displaced in response to the rotational operation of the throttle lever 2 in the reverse direction β and the urging unit 14 which generates an urging force in response to the displacement of the displacement unit 13. Therefore, when operating the throttle lever 2 in the reverse direction β, the operating load can be reliably and smoothly generated.

In addition, according to the present embodiment, the throttle operating device includes the return spring S which urges the throttle lever 2 to the initial position when the throttle lever 2 is rotated in the forward direction α and the reverse direction β and the urging force due to the return spring S and the operating load due to the operating load generating unit 12 are generated when the throttle lever 2 is rotated in the reverse direction β. Therefore, when the throttle lever 2 is operated in the reverse direction β, a relatively large drag force (combined operating load) can be generated by adding the operating load generated by the operating load generating unit 12 and the urging force generated by the return spring S.

Although the embodiments are described above, the invention is not limited to this. For example, the resistance force applying unit 7 may be attached to a component (mounting member 6 or the like) different from the rotating member 5, or may be made of a material other than resin. Further, the sliding member K is made of a metal member, but may be made of another material as long as the sliding of the resistance force applying unit 7 can cause friction to apply a resistance force, and may be attached to the cover member 3 by a method other than insert molding such as screwing. In addition, a separate sliding member K may not be provided, and for example, the lower surface 3b of the cover member 3 may be processed to be a sliding surface for the resistance force applying unit 7.

If the gist is the same as that of the invention, it can be applied to those having a different appearance shape or those to which other functions are added.

According to an aspect of the invention, there is provided a throttle operating device including: a fixing member which is fixed to a vicinity of a grip formed at a tip of a handlebar of a vehicle; a throttle lever which is attached by extending from the fixing member and configured to be pivoted while the grip is gripped; a detection sensor configured to detect a rotational operation angle of the throttle lever; and a resistance force applying unit configured to generate friction during a rotational operation of the throttle lever to apply a resistance force, where a drive source of a vehicle is controlled based on the rotational operation angle of the throttle lever detected by the detection sensor.

According to the above, since the resistance force applying unit which can generate friction during the rotational operation of the throttle lever to apply the resistance force is provided, the operability during the rotational operation of the throttle lever can be improved.

The throttle operating device may further include: a shaft member which is connected to the throttle lever and rotates around an axis in response to the rotational operation of the throttle lever; and a magnet which can rotate together with the shaft member in response to the rotational operation of the throttle lever, where the detection sensor is attached at a position corresponding to the magnet and is configured to detect the rotational operation angle of the throttle lever based on a magnetic change of the magnet which rotates according to the throttle lever.

According to the above, since the detection sensor is attached to the position corresponding to the magnet and can detect the rotational operation angle of the throttle lever based on the magnetic change of the magnet rotating according to the throttle lever, the rotational operation angle of the throttle lever can be accurately detected.

The throttle operating device may further include a rotating member which is connected to the shaft member and rotates in response to the rotational operation of the throttle lever, where the resistance force applying unit is attached to the rotating member.

According to the above, the rotating member which is connected to the shaft member and rotates in response to the rotational operation of the throttle lever is provided and the resistance force applying unit is attached to the rotating member. Therefore, the resistance force can be smoothly supplied by the resistance force applying unit by the rotation of the rotating member and the throttle operating device can be miniaturized.

In the throttle operating device, the cover member may be provided to cover an opening of the fixing member, a sliding surface may be formed on the cover member, and the sliding surface may be composed of a surface of a sliding member formed along a movement locus of the resistance force applying unit.

According to the above, the cover member is provided to cover the opening of the fixing member and the sliding surface is formed on the cover member, and the sliding surface is composed of the surface of the sliding member formed along the movement locus of the resistance force applying unit. Therefore, the cover member can have a function of covering the opening of the fixing member and a function of holding the sliding surface for the resistance force applying unit, and the resistance force applying unit can be surely slid along the sliding surface.

In the throttle operating device, the resistance force applying unit may be composed of a resin member urged toward the sliding surface by an urging unit attached to the rotating member, and the sliding member may be composed of a metal member insert-molded into the cover member.

According to the above, the resistance force applying unit is composed of the resin member urged toward the sliding surface by the urging unit attached to the rotating member and the sliding member is composed of the metal member which is insert-molded into the cover member. Therefore, a frictional force due to the resistance force applying unit can be stably generated.

The throttle operating device may further include a sealing member for sealing an inside of the fixing member, where the cover member is configured to perform sealing by pressing the sealing member while being attached to the fixing member.

According to the above, the sealing member for sealing the inside of the fixing member is provided and the cover member can perform sealing by pressing the sealing member while being attached to the fixing member. Therefore, in addition to the function of covering the opening of the fixing member, the cover member can have a function of maintaining sealing by the sealing member.

In the throttle operating device, the detection sensor may be attached to the cover member at a position corresponding to the magnet.

According to the above, the detection sensor is attached to the cover member at the position corresponding to the magnet. Therefore, the cover member can have the function of covering the opening of the fixing member and the function of attaching the detection sensor, and further the throttle operating device can be miniaturized and the number of parts can be reduced.

In the throttle operating device, the throttle lever may be configured to be pivoted in a forward direction and a reverse direction, and an operating load in the reverse direction may be set to be larger than an operating load in the forward direction.

According to the above, the throttle lever can be pivoted in the forward direction and the reverse direction and the operating load in the reverse direction is set to be larger than the operating load in the forward direction. Therefore, when operating the throttle lever in the forward direction, it is possible to prevent an accidental operation in the reverse direction.

The throttle operating device may further include an operating load generating unit which generates a predetermined operating load when the throttle lever is rotated in the reverse direction and does not generate the operating load when the throttle lever is rotated in the forward direction.

According to the above, the throttle operating device includes the operating load generating unit which generates the predetermined operating load when the throttle lever is rotated in the reverse direction and does not generate the operating load when the throttle lever is rotated in the forward direction. Therefore, the operating load in the reverse direction of the throttle lever can be set to be larger than the operating load in the forward direction.

The throttle operating device may further include: a shaft member which is connected to the throttle lever and rotates around an axis in response to the rotational operation of the throttle lever; and a rotating member which is connected to the shaft member and rotates according to a pivoting operation of the throttle lever, where the operating load generating unit is configured to rotate together with the rotating member and generate the operating load.

According to the above, the operating load generating unit can rotate together with the rotating member and generate the operating load. Therefore, when operating the throttle lever in the reverse direction, the operating load can be reliably generated.

In the throttle operating device, the operating load generating unit may include a displacement unit which is displaced in response to a rotational operation of the throttle lever in the reverse direction and an urging unit which generates an urging force in response to a displacement of the displacement unit.

According to the above, the operating load generating unit includes the displacement unit which is displaced in response to the rotational operation of the throttle lever in the reverse direction and the urging unit which generates the urging force in response to the displacement of the displacement unit. Therefore, when operating the throttle lever in the reverse direction, the operating load can be reliably and smoothly generated.

The throttle operating device may further include a return spring which urges the throttle lever to an initial position when the throttle lever is rotated in the forward direction and the reverse direction, where an urging force due to the return spring and the operating load due to the operating load generating unit are generated when the throttle lever is rotated in the reverse direction.

According to the above, the throttle operating device includes the return spring which urges the throttle lever to the initial position when the throttle lever is rotated in the forward direction and the reverse direction and the urging force due to the return spring and the operating load due to the operating load generating unit are generated when the throttle lever is rotated in the reverse direction. Therefore, when the throttle lever is operated in the reverse direction, a relatively large drag force can be generated by adding the operating load generated by the operating load generating unit and the urging force generated by the return spring.

The invention claimed is:

1. A throttle operating device on a handlebar of a vehicle and for operating a drive source of said vehicle, said throttle operating device comprising:
a fixing member;
a throttle lever which is attached by extending from the fixing member and configured to be pivoted;
a detection sensor configured to detect a rotational operation angle of the throttle lever;
a resistance force applying unit configured to generate friction during a rotational operation of the throttle lever to apply a resistance force, wherein
a drive source of a vehicle is controlled based on the rotational operation angle of the throttle lever detected by the detection sensor;
a shaft member which is connected to the throttle lever and rotates around an axis in response to the rotational operation of the throttle lever;
a magnet which can rotate together with the shaft member in response to the rotational operation of the throttle lever, wherein
the detection sensor is attached at a position corresponding to the magnet and is configured to detect the rotational operation angle of the throttle lever based on a magnetic change of the magnet which rotates according to the throttle lever;
a rotating member which is connected to the shaft member and rotates in response to the rotational operation of the throttle lever, wherein
the resistance force applying unit is attached to the rotating member; and
a cover member is provided to cover an opening of the fixing member, a sliding surface is formed on the cover member, and the sliding surface is composed of a surface of a sliding member formed along a movement locus of the resistance force applying unit.

2. The throttle operating device according to claim 1, wherein
the resistance force applying unit is composed of a resin member urged toward the sliding surface by an urging unit attached to the rotating member, and the sliding member is composed of a metal member insert-molded into the cover member.

3. The throttle operating device according to claim 1, further comprising
a sealing member for sealing an inside of the fixing member, wherein the cover member is configured to perform sealing by pressing the sealing member while being attached to the fixing member.

4. The throttle operating device according to claim 1, wherein
the detection sensor is attached to the cover member at a position corresponding to the magnet.

5. The throttle operating device according to claim 1, wherein
the throttle lever is configured to be pivoted in a forward direction and a reverse direction, and an operating load in the reverse direction is set to be larger than an operating load in the forward direction.

6. The throttle operating device according to claim 5, further comprising
an operating load generating unit which generates a predetermined operating load when the throttle lever is rotated in the reverse direction and does not generate the operating load when the throttle lever is rotated in the forward direction.

7. The throttle operating device according to claim 6, further comprising:
a shaft member which is connected to the throttle lever and rotates around an axis in response to the rotational operation of the throttle lever; and
a rotating member which is connected to the shaft member and rotates according to a pivoting operation of the throttle lever, wherein
the operating load generating unit is configured to rotate together with the rotating member and generate the operating load.

8. The throttle operating device according to claim 6, wherein
the operating load generating unit includes a displacement unit which is displaced in response to a rotational operation of the throttle lever in the reverse direction and an urging unit which generates an urging force in response to a displacement of the displacement unit.

9. The throttle operating device according to claim 6, further comprising
a return spring which urges the throttle lever to an initial position when the throttle lever is rotated in the forward direction and the reverse direction, wherein
an urging force due to the return spring and the operating load due to the operating load generating unit are generated when the throttle lever is rotated in the reverse direction.

10. The throttle operating device according to claim 1, wherein the resistance force applying unit comprises an external surface that generates friction during the rotational operation of the throttle lever to apply the resistance force.

* * * * *

UNITED STATES PATENT AND TRADEMARK OFFICE
CERTIFICATE OF CORRECTION

PATENT NO. : 11,762,411 B2
APPLICATION NO. : 17/540732
DATED : September 19, 2023
INVENTOR(S) : Yukio Oshiro It is certified that error appears in the above-identified patent and that said Letters Patent is hereby corrected as shown below:

In the Specification

Column 9, Line 42, "reverse direction is" should be -- reverse direction β is --.

Signed and Sealed this
Twenty-third Day of April, 2024

*Katherine Kelly Vidal*

Katherine Kelly Vidal
*Director of the United States Patent and Trademark Office*